Figure 1:
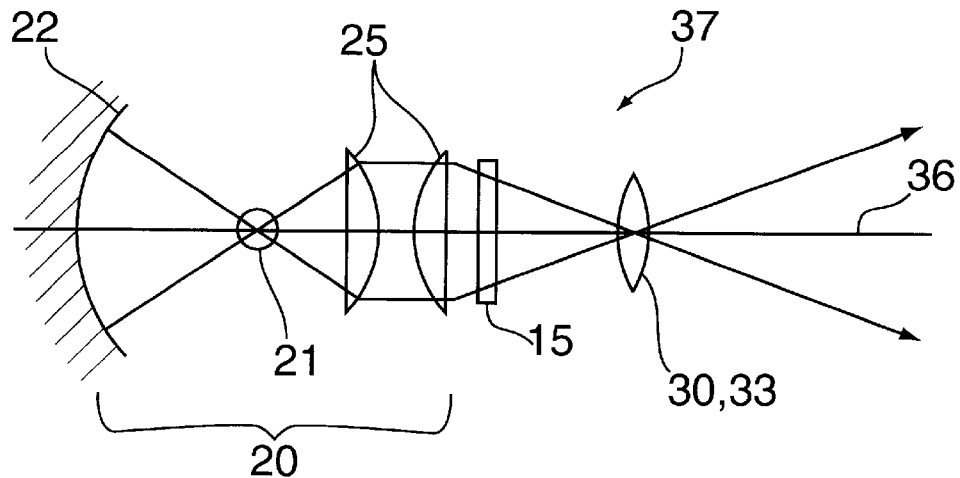

United States Patent [19]
Seufert

[11] Patent Number: 5,897,192
[45] Date of Patent: Apr. 27, 1999

[54] REAR PROJECTION MODULE

[76] Inventor: Heinz Seufert, Vogelsang 31, D-76229 Karlsruhe, Germany

[21] Appl. No.: 08/722,044
[22] PCT Filed: Apr. 8, 1995
[86] PCT No.: PCT/DE95/00479
  § 371 Date: Oct. 4, 1996
  § 102(e) Date: Oct. 4, 1996
[87] PCT Pub. No.: WO95/28664
  PCT Pub. Date: Oct. 26, 1995

[30]  Foreign Application Priority Data

Apr. 18, 1994 [DE] Germany ............... 44 13 024.4

[51] Int. Cl.[6] .................................................. G03B 21/14
[52] U.S. Cl. .............................. 353/74; 353/94; 353/119; 353/72
[58] Field of Search .................................... 353/74, 75, 76, 353/77, 78, 94, 119, 72, 73, 93; 359/454, 455, 456, 457, 460

[56]  References Cited

U.S. PATENT DOCUMENTS

| 4,725,134 | 2/1988 | Ogino ............................. 353/74 |
| 4,866,530 | 9/1989 | Kalua . | |
| 5,011,277 | 4/1991 | Ogino et al. ...................... 353/94 |
| 5,048,949 | 9/1991 | Sato et al. ........................ 353/77 |
| 5,116,117 | 5/1992 | Miyashita ......................... 353/94 |
| 5,184,224 | 2/1993 | Mitani et al. ................... 359/456 |
| 5,208,620 | 5/1993 | Mitsutake et al. ............... 353/74 |
| 5,296,882 | 3/1994 | Nelson et al. .................... 353/38 |
| 5,485,308 | 1/1996 | Hirata et al. ................... 359/457 |
| 5,513,036 | 4/1996 | Watanabe et al. ............... 359/456 |

FOREIGN PATENT DOCUMENTS

| 0376332 | 7/1990  | European Pat. Off. . |
| 0471478 | 2/1992  | European Pat. Off. . |
| 0516479 | 12/1992 | European Pat. Off. . |
| 4031053 | 4/1992  | Germany . |
| 4128059 | 3/1993  | Germany . |
| 4139975 | 5/1992  | Japan . |

*Primary Examiner*—William Dowling
*Attorney, Agent, or Firm*—Sprung Kramer Schaefer & Briscoe

[57]  ABSTRACT

The invention relates to a back projection module (1) for displaying an image on a large-area projection screen (2). An improved construction of the projection screen (2) and the supports holding it is proposed to obtain a substantially continuous large image by means of adjacent projection modules (1). The invention also relates to a suitable module housing permitting the arrangement of adjacent projections modules with a shallow depth. Further details concern the improvement in the quality of the optical image.

27 Claims, 16 Drawing Sheets

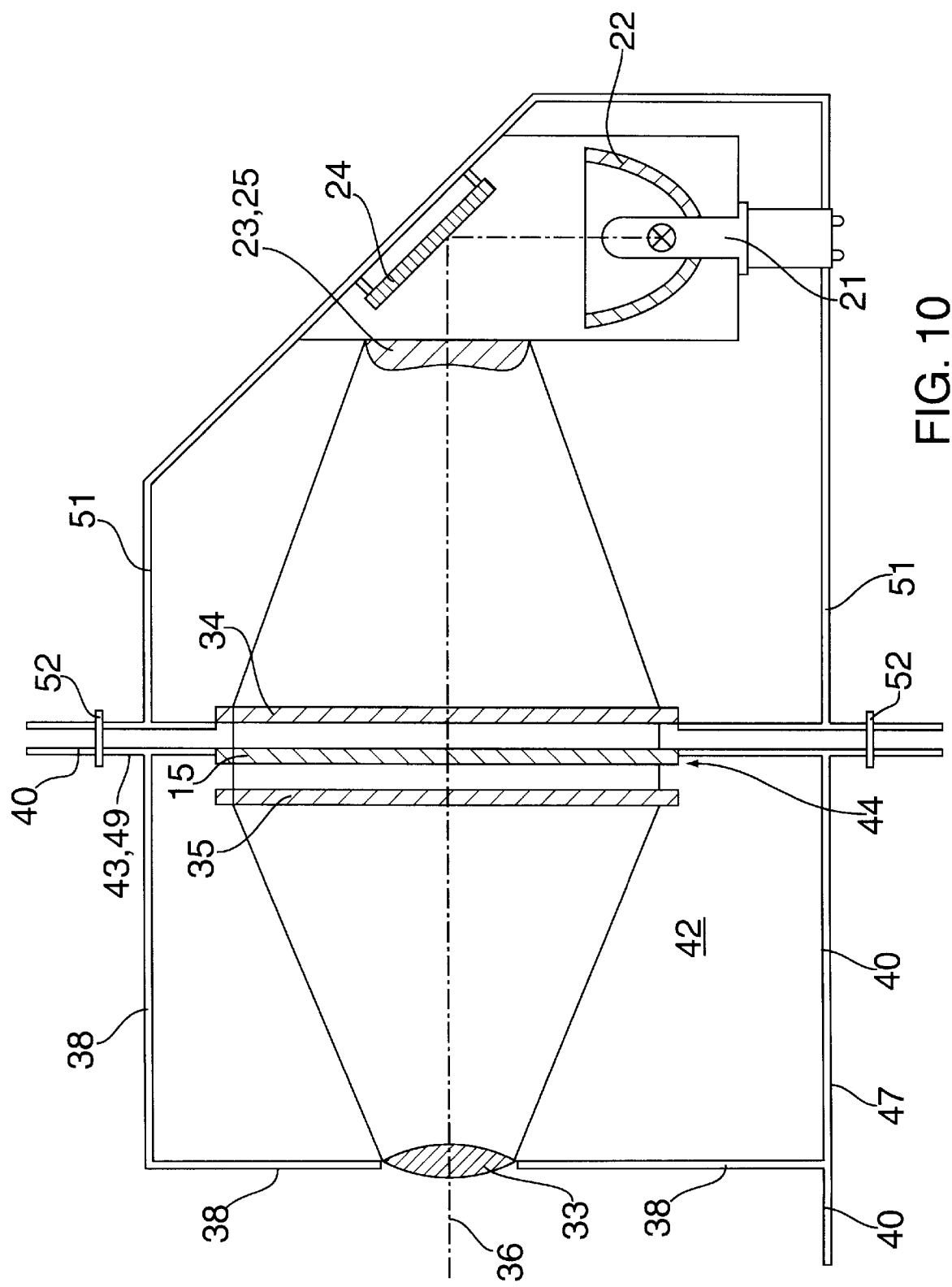

Gl. 1 $\quad z = \sum_i \sum_j w_{ij} B_{ij}(x,y)$

Gl. 2
$$\begin{pmatrix} X_0 \\ X_1 \\ X_2 \\ X_3 \\ X_4 \\ X_5 \end{pmatrix} = \begin{pmatrix} -37,5 \\ -22,5 \\ -7,5 \\ 7,5 \\ 22,5 \\ 37,5 \end{pmatrix}$$

Gl. 3
$$\begin{pmatrix} Y_0 \\ Y_1 \\ Y_2 \\ Y_3 \\ Y_4 \\ Y_5 \end{pmatrix} = \begin{pmatrix} -37,5 \\ -22,5 \\ -7,5 \\ 7,5 \\ 22,5 \\ 37,5 \end{pmatrix}$$

Gl. 4

$$w_{ij} = \begin{pmatrix} w_{11} & w_{12} & \cdot & \cdot & \cdot & w_{18} \\ w_{21} & \cdot & & & & \cdot \\ \vdots & & & & & \vdots \\ w_{81} & \cdot & \cdot & \cdot & \cdot & w_{88} \end{pmatrix} =$$

$$\begin{pmatrix} -32,687503 & -0,976151 & 5,518672 & 3,309733 & w_{14} & w_{13} & w_{12} & w_{11} \\ 4,094080 & 7,440582 & 5,666800 & 3,276497 & w_{24} & w_{23} & w_{22} & w_{21} \\ 2,457112 & 3,979076 & 3,560154 & 1,735435 & w_{34} & w_{33} & w_{32} & w_{31} \\ -2,775414 & -1,511627 & -0,726666 & -0,845827 & w_{44} & w_{43} & w_{42} & w_{41} \\ w_{41} & w_{42} & w_{43} & w_{44} & w_{44} & w_{43} & w_{42} & w_{41} \\ w_{31} & w_{32} & w_{33} & w_{34} & w_{34} & w_{33} & w_{32} & w_{31} \\ w_{21} & w_{22} & w_{23} & w_{24} & w_{24} & w_{23} & w_{22} & w_{21} \\ w_{11} & w_{12} & w_{13} & w_{14} & w_{14} & w_{13} & w_{12} & w_{11} \end{pmatrix}$$

Gl. 5 $\quad w_{ij} =$ $$\begin{pmatrix} -18,520627 & -4,435246 & 4,952040 & 1,190434 & w_{14} & w_{13} & w_{12} & w_{11} \\ 0,974272 & 5,357705 & 4,595051 & 1,787724 & w_{24} & w_{23} & w_{22} & w_{21} \\ 0,467986 & 2,365018 & 2,996585 & 1,327504 & w_{34} & w_{33} & w_{32} & w_{31} \\ -2,417657 & -1,435664 & -0,558187 & -1,261030 & w_{44} & w_{43} & w_{42} & w_{41} \\ w_{41} & w_{42} & w_{43} & w_{44} & w_{44} & w_{43} & w_{42} & w_{41} \\ w_{31} & w_{32} & w_{33} & w_{34} & w_{34} & w_{33} & w_{32} & w_{31} \\ w_{21} & w_{22} & w_{23} & w_{24} & w_{24} & w_{23} & w_{22} & w_{21} \\ w_{11} & w_{12} & w_{13} & w_{14} & w_{14} & w_{13} & w_{12} & w_{11} \end{pmatrix}$$

Gl. 6 $\quad w_{ij} =$ $$\begin{pmatrix} -37,539356 & -1,352006 & 5,000918 & 3,474523 & w_{14} & w_{13} & w_{12} & w_{11} \\ 7,429497 & 5,480469 & 5,128205 & 3,458892 & w_{24} & w_{23} & w_{22} & w_{21} \\ -1,443832 & 4,354533 & 2,830355 & 1,765795 & w_{34} & w_{33} & w_{32} & w_{31} \\ -1,569065 & -0,957221 & -0,497148 & -0,831684 & w_{44} & w_{43} & w_{42} & w_{41} \\ w_{41} & w_{42} & w_{43} & w_{44} & w_{44} & w_{43} & w_{42} & w_{41} \\ w_{31} & w_{32} & w_{33} & w_{34} & w_{34} & w_{33} & w_{32} & w_{31} \\ w_{21} & w_{22} & w_{23} & w_{24} & w_{24} & w_{23} & w_{22} & w_{21} \\ w_{11} & w_{12} & w_{13} & w_{14} & w_{14} & w_{13} & w_{12} & w_{11} \end{pmatrix}$$

FIG. 26

REAR PROJECTION MODULE

The invention relates to a rear projection module for displaying an image on a large-area projection screen, comprising a light transmissive picture generator for depicting the image on a reduced scale, an illumination unit for the transillumination of the light transmissive picture generator and a projection unit for the magnified imaging onto the projection screen of the image depicted by the light transmissive picture generator.

Such rear projection modules are widely used where a large image is to be displayed. The image originals in the picture generator can be video images, computer images or images of another kind. By a large image are understood images which typically have display screen diagonals of more than 0.5 m. Common fields of application for such rear projection modules are data display terminals which are to be viewed by several persons simultaneously, as is the case with conferences or presentations. Large-image rear projection is in wide use in particular in modern supervisory control centers.

The light transmissive picture generator is typically a light transmissive liquid crystal display unit. It can be constructed as a black-and-white or preferably as a coloured liquid crystal display. According to the current state of the art in the matter of liquid crystal display units there are two classes, which differ in size. The smaller liquid crystal display units, which are for example manufactured from polysilicon with sizes of the screen diagonal of about 2 inches, have the disadvantage that the so-called pixel aperture is relatively small. The pixel aperture is a measure of the area fraction with which the liquid crystal display unit is translucent. This, combined with the high luminous intensity required to achieve a bright projected image, leads to barely controllable heat dissipation problems and disadvantageously high surface temperatures.

These disadvantages are overcome if larger-area liquid crystal display units having diagonals of 6 to 20 inches, which are manufactured from amorphous silicon according to the present state of the art, are used. The pixel aperture is greater with these units. In addition the surface temperature is also diminished as the result of the reduced luminous intensity, so that long service lives are obtained even with high luminous fluxes. In the context of the invention there are preferred according to the current technology liquid crystal display units with diagonals of around 10 inches. It is generally the case with optical imagings that the technical difficulties in achieving a fully satisfactory imaging also increase with the size of the image. It is astonishing, therefore, that the high quality requirements in the area of application according to the invention can be fulfilled with such picture generator sizes.

A known illumination unit consists of a lamp, a reflector and a condenser. Metal-halide short-arc lamps are preferably used.

The projection unit for the magnified imaging onto a projection screen of the image depicted by a light transmissive picture generator always includes a projecting lens. Occasionally the picture generator is also related to the projection unit.

Known projection screens for rear projection modules possess a lenticular sheet and a support sheet, each of which has a light-input-side face facing the projection unit, a light-output-side face lying opposite the latter and a peripheral surface connecting the input face to the output face. Between the input face and the output face of the projection screen a Fresnel structure is disposed. The Fresnel structure can be formed for example on the light-input-side face of the lenticular sheet, the light-output-side face of the support sheet or on a separate Fresnel sheet. The construction of the projection screen from two or three sheets is governed by static and optical considerations. The support sheet serves as a mechanical support for the projection screen as a whole.

The Fresnel structure refracts the incident light for the illumination of the following lenticular sheet. It is thereby ensured that the image appears approximately uniformly bright from any angle of view; the brightness nevertheless remains dependent on the angle of view. The Fresnel structure of a Fresnel sheet is in most cases oriented towards the lenticular sheet, in order not to have an excessively large decrease in light at the edge.

A lenticular sheet is a sheet which is constructed with a plane surface on the light input side and profiled in a particular manner on the output side. On the inside of the lenticular sheet are disposed in the image plane small diffusers, which bring about a small, initially axially symmetrical expansion of the light impinging from the object. The profiling expands the light strongly only in the preferred horizontal direction. Viewing of the image under large horizontal angles of view is thus made possible. The vertical angles of view as a rule have to be varied only over a small range (e.g. sitting and standing observer). Altogether, a far brighter image is produced for the preferred angles of view compared with a simple diffusing screen. The profiled surface of the lenticular sheet comprises in most cases a black matrix, which is a partial coating by means of which reflections of scattered light originating from the environment are suppressed.

If, where there are given quality standards, the displayed image has to exceed a particular size, this is not possible with a single rear projection module. The reason for this is that the projection sheet, in particular the Fresnel sheet or structure, cannot be manufactured at will in any size. In addition the resolution would also be insufficient, since the number of picture elements in the light transmissive picture generator is limited. It is therefore necessary in such cases to assemble the image from subsidiary images, which are each displayed by a rear projection module. The image displayed by each rear projection module becomes in this case a subsidiary image of the overall image displayed by all the rear projection modules together.

The problem is therefore posed of assembling the subsidiary images displayed by the individual rear projection modules into a large image in such a way that a chessboard-like character of the overall image is avoided. In particular a broad, easily visible web between the individual subsidiary images is to be avoided. It is necessary to this end to string the large and heavy projection screens almost seamlessly together into a large image projecting screen, without mechanical support elements limiting the mutual spacing. At the same time it must be guaranteed that the image displayed by a rear projection module extends right up to the edge and the corners of the projection screen, so that an area of dark appearance is not obtained.

There is no satisfactory solution for solving this problem in the current state of the art. In the document DE 40 31 053 A1 a large projecting screen is described in which the subsidiary images projected partly overlap in the edge areas. In this case the overlapping subsidiary areas projected by two adjacent projectors are to be darkened by stripe-shaped blindes to such an extent that the brightness of the overlapping areas matches the brightness of the remaining image areas. The large image is displayed on a large projecting screen which can be formed from a single large projection sheet or assembled from individual subsidiary projecting screens. This arrangement meets the requirements imposed neither in optical nor in static terms.

In order to solve the problem of developing the rear projection modules mentioned in the preamble in such a way that the image displayed on the projection screen can be strung together with the images of other projection modules virtually web-free in a matrix arrangement, it is proposed that the surface dimensions of the lenticular sheet and of the support sheet each be arranged peripherally so as to be smaller on the light-input-side face than on the light-output-side face, wherein the surface dimensions of the light-input-side face of the lenticular sheet and of the light-output-side face of the support sheet correspond to those of the Fresnel structure disposed between them. In addition the support sheet is supported on its peripheral surface by a support element, whose partial section serving as a fixing part and situated in the propagation direction of the projected light at the end of the support element clasps the support sheet at least in certain sections of its peripheral surface. Furthermore an area of the peripheral surface of the lenticular sheet is connected to an area of the peripheral surface of the support sheet and/or an area of the outer surface of the fixing part by means of a connection means arranged peripherally distributed at least in certain sections, wherein the outer dimensions of the fixing part and of the connection means exceed the surface dimensions of the light-output-side face of the lenticular sheet by not more than the spacing of adjacent picture elements on the lenticular sheet.

At the same time the refractory properties of the support sheet and of the Fresnel structure, the thickness of the support sheet, the surface dimensions of the Fresnel structure and the support-sheet-enclosing profile of the fixing part can be coordinated with one another in such a way that the rays of a picture element closest to the edge, which are imaged by the projection unit, pass through the edge surface, that is to say the outer boundary surface of the Fresnel structure, and enter the lenticular sheet at right angles. The spacing between the ray of a picture element closest to the edge and the edge of the Fresnel structure should preferably come to less than 0.5 mm. In the case of a matrix light transmissive picture generator and a Fresnel lens arranged according to the invention between the latter and the projecting lens these conditions apply in particular to the rays leaving the associated picture element, pixel or sub-pixel parallel to the surface normal of the matrix light transmissive picture generator.

The peripheral surface of the support sheet and the profile of the fixing part can be formed as a result of the construction according to the invention in such a way that the light of a picture element of the projected image closest to the edge can pass through the edge surface of the Fresnel structure unimpeded by the fixing part. The fixing part and the support sheet preferably butt positively against one another and limit the relative movement perpendicular to the optical axis. The fixing part is connected to the support sheet by means of a suitable connection technique, for example by bonding or ultrasonic sealing. Its profile is formed in such a way that the inner dimensions of the fixing part increase essentially in the propagation direction of the light, that is to say become greater in such a way that the light of the picture element closest to the edge is not impeded in its propagation.

The fixing part surrounds the support sheet as a rule in an area situated on the light input side, since the light-output-side area of the peripheral surface has to be kept free from the fixing part for the passing of the edge rays into the edge surface of the Fresnel structure. It is not necessary on static grounds for the fixing part to surround completely the peripheral surface of the support sheet; it is sufficient if the fixing part clasps an area of the peripheral surface of the support sheet which includes, depending on the weight of the projection screen, between one fifth and four fifths of the profile of the support sheet.

The fixing part should surround the support sheet preferably over its entire periphery, since the highest mechanical stability is achieved in this way. As a rule, however, it is sufficient if the fixing part clasps the support sheet at least in certain sections of its peripheral surface, wherein at least 5%, preferably at least 20% of the periphery, should be clasped.

It is likewise not necessary for the entire peripheral surface of the lenticular sheet to be connected to the entire peripheral surface of the support sheet by means of a connection means arranged at least in certain sections of its periphery. In this case also it is sufficient, depending on the degree of the loading, if areas which include in each case between 10% and 90%, preferably more than 30%, of the profile of the connected sheets are connected by means of a connection means. The connection means is likewise preferably arranged over the entire periphery, but should surround at least 5%, preferably at least 20%, of the periphery.

The construction according to the invention of the rear projection module permits an essentially web-free stringing together. The smallest spacing of picture elements displayed by adjacent rear projection modules is then given by the spacing of the lenticular sheets and the spacing of the picture elements from the edge of the lenticular sheet. Because of the thermal expansion the lenticular sheets should not butt against one another, but rather the spacing corresponding to the extent of a possible thermal expansion should be observed. Since the displayed images are composed of picture elements spaced at a distance from one another, it is furthermore not always essential that the outer dimensions of the fixing part and of the connection means are not greater than the surface dimensions of the light-output side face of the lenticular sheet, even if this represents a preferred construction. In order to achieve an essentially web-free stringing together, it is sufficient if the outer dimensions of the fixing part and of the connection means exceed the surface dimensions of the light-output-side face of the lenticular sheet by not more than the spacing of adjacent picture elements on the lenticular sheet.

By the spacing of the picture elements is meant the step width from one picture element to the next, which is given by the resolution. With a black-and-white image the spacing is the step width from one pixel to the next, and with a coloured image the step width from one coloured picture element to the next, wherein a picture element can also be composed of several sub-pixels.

Because of the pixel structure of the displayed images it is also not essential that the picture element closest to the edge lies directly on the edge. It is sufficient if such a picture element lies very near the edge. With advantage the spacing from the edge, measured on the light output side of the lenticular sheet, is smaller than that of the picture elements from each other, preferably smaller than half the picture element spacing or smaller than the dimension of a picture element itself, preferably smaller than the dimension of half a picture element. In rear projection modules according to the invention manufactured in series a spacing of the picture element closest to the edge from the edge of the light output side or from the peripheral surface of the lenticular sheet of less than 0.3 mm was achieved.

According to a further advantageous feature it is proposed that the surface dimensions of the light-output-side face of the lenticular sheet be less than 2 mm, preferably less than 1 mm, greater than those of the light-input-side face. The lateral projection of the light-output-side face beyond the light-input-side face of the lenticular sheet is half the above-mentioned value in each case.

The smaller the difference in the light-output- and light-input-side surface dimensions is, the smaller can the spacing of the picture element closest to the edge from the edge be. A practical lower limit is given by the fact that, because of the pixel structure of the displayed images and the distance to be observed by virtue of the thermal expansion, a still further reduced edge spacing does not provide a further benefit, and also by the fact that the connection means has a minimum space requirement on strength grounds.

According to a further preferred feature it is proposed that the peripheral surface of the lenticular sheet be constructed in such a way that the light of a picture element closest to the edge, situated in the image plane of the projected image in the lenticular sheet, can escape through the edge of the light-output-side face of the lenticular sheet unimpeded by the connection means.

In this way it is made possible for the light of a picture element closest to the edge scattered laterally by the diffusers in the image plane of the lenticular sheet to pass right into the edge of the light-output-side face of the lenticular sheet. The light can be diffused without shading right into the side between the light-output-side face and the peripheral surface of the lenticular sheet. The light can therefore reach the edge area of the light-output-side face of the lenticular sheet, into which edge area direct light cannot pass because of the smaller size of the Fresnel sheet and the shading by the connection means, and in this way brighten optically the light-output-side edge of the lenticular sheet and the intermediate space between two projection screens, as a result of which the web-free appearance of the image is further improved.

A further advantageous construction consists in the fact that the peripheral surface of the lenticular sheet or of the support sheet is constructed in a stepped or terraced shape. This construction is not very demanding in manufacturing terms, in particular if only a single step is provided, and at the same time provides adequate stability of the whole projection screen and its support system.

According to a further advantageous feature it is proposed that the fixing part enclosing the peripheral surface of the support sheet is constructed wedge-shaped. The peripheral surface of the support sheet should naturally be correspondingly constructed. The point of the wedge can thus be tapered or truncated. It is important that as large a wedge angle as possible is obtained, so that the material thickness of the fixing part is as great as possible, in order to achieve an adequate strength in view of the weight of the projection screen, which can come to 10 kg or more. The maximum possible wedge angle is determined by the requirement that the fixing part must not shade the ray of the picture element closest to the edge.

It has proved to be advantageous in the context of the invention if the Fresnel structure is constructed on a Fresnel sheet which is disposed between the support sheet and the lenticular sheet, since advantages in relation to the manufacture and the optical quality are associated with this. It is particularly advantageous if the Fresnel structure is constructed on the light-output-side face of the Fresnel sheet.

A first advantageous construction can consist in the light-input-side face of the Fresnel sheet being connected to the light-output-side face of the support sheet. The connection can take place for example by bonding or surface laminatiion. With this construction, however, the appearance of so-called ghost images has to be expected, which can cause problems in many applications.

A second, advantageous construction, in which the ghost images are reduced, consists in the light-input-side face of the Fresnel sheet butting against the light-output-side face of the support sheet. The boundary layer of the faces butting against one another causes the optical effects which contribute to ghosting to be reduced.

A third, preferred construction consists in the light-input-side face of the Fresnel sheet being separated from the light-output-side face of the support sheet by a gap. The best results are achieved with a gap, since the air located between the faces guarantees a minimum spacing which is not destroyed by adhesion effects. The width of the gap is with advantage less than 0.5 mm, preferably less than 0.3 mm.

According to a further advantageous feature it is proposed that at least one spacing element ensuring maintenance of a small surface separation be disposed between the light-output-side face of the support sheet and the light-input-side face of the Fresnel sheet.

The support sheet consists conventionally of a plastics material, for example polymethyl methacrylate, through which water vapour can diffuse or penetrate due to capillary effects. Water can also penetrate through the connection means at the peripheral surface. There can therefore form in the course of time between the support sheet and the Fresnel sheet a water film, which leads to irregular black patches on the projection screen. This is prevented by the spacing element, which preferably can comprise a multiplicity of pins or a fabric- or gauze-type structure, by means of which the two surfaces are kept a sufficiently large distance apart. Practical values for this distance lie in the range of 0.05 to 0.5 mm. This problem does not arise between the Fresnel sheet and the lenticular sheet because of the Fresnel structure of the Fresnel sheet.

It is advantageous if the Fresnel sheet is a Fresnel film with a thickness of less than 1.0 mm, preferably less than 0.5 mm, particularly preferably less than 0.3 mm, in order to prevent "ghost images" produced by multiple reflections in the Fresnel sheet.

According to another advantageous feature it is proposed that the lenticular sheet be surface laminated on the light-input-side face and the light-output-side face. The two-sided lamination of the lenticular sheet with the same material differing from the material of the lenticular sheet itself, in particular with a plastics material, counteracts deflection and thus improves the planarity of the sheet. The same also applies to the support sheet.

In order to improve the mechanical stability, it can be provided that an area of the peripheral surface of the support sheet be connected to the fixing part by a securing means disposed at least in certain sections of the periphery. In this case the securing means is disposed on at least 5%, preferably at least 20%, of the periphery of the support sheet. In an advantageous construction in manufacturing terms the connection means is also the securing means.

The connection means or the securing means can in a preferred construction be adhesive strips which are stuck onto the peripheral surfaces. They meet the requirements of a small material thickness combined with a high binding force, which is provided by the adhesive. Adhesive strips are very cost-effective. They also have the advantage that they are flexible, so that residual manufacturing inaccuracies can be evened out. In the case of the connection means the peripherally distributed arrangement ensures an adequate fixing of the lenticular sheet and optionally of the Fresnel sheet to the support sheet. The fixing part holding the support sheet can also be connected to the support sheet on the profile enclosing the peripheral surface of the support sheet, by suitable connection methods such as adhesion or welding, and absorb forces.

The modular construction of a projecting screen with rear projection modules gives rise to further requirements which call for a sensible, practical solution. A rear projection module is in most cases provided with a module housing which screens the light input face of the projection screen against ambient light and on the front side of which the projection screen is disposed. The problem therefore arises with rear projection modules of constructing the module housing in such a way that the rear projection modules can be strung together and that the whole assembly does not have a high space requirement, can be erected without complications and at the same time makes it possible for the necessary maintenance and adjustment work to be easily carried out.

In order to solve this problem, it is proposed that the projection unit be disposed on the inside of the module housing, the light transmissive picture generator be disposed in a cutout in a wall area of the module housing, the illumination unit be disposed outside the module housing in a light source housing which is removable at the cutout of the module housing and can be attached to the module housing in such a way that it projects beyond the wall area of the module housing, and that the module housing should comprise in a corresponding area, which is provided for a light source housing attached to an adjacent rear projection module, a chamfering, opening or cutout accessible from its outside, said chamfering, opening or cutout being so constructed that the light source housing of the adjacent rear projection module can be disposed in the corresponding area.

This construction of the module housing makes possible a modular layout of a projecting screen with rear projection modules strung and/or stacked together, since the module housings can be arranged overlapping one another or mutually penetrating one another. Advantages are associated with this as regards the overall depth of the rear projection module, the space requirement of the arrangement and the facilitation of maintenance and adjustment operations.

The projection screens of the rear projection modules can moreover be arranged linearly in a surface next to and/or above one another, whereby a large image with a plane surface is obtained. In other applications it may however also be advantageous to string the projection screens together polygonally in a roughly curved arrangement, something which is possible with the construction according to the invention.

In the light source housing are disposed the light source, the reflector and the condenser. The light transmissive picture generator is located at the transition point from the module housing to the light source housing. Advantages with respect to the manufacture and maintenance of the rear projection module are associated with this. On the inside of the module housing are those components which have high adjustment requirements, namely all those which affect the projection part. These components must be set with high precision during the assembly of the module housing. During normal operation of the rear projection module, however, they do not as a rule require any regular maintenance, so that maintenance operations on the illumination unit disposed outside the module housing are possible without adjustment operations thereby becoming necessary on the components disposed inside the module housing.

Conversely those components which call for occasional maintenance or replacement, such as the components of the illumination unit or of the light transmissive picture generator, are easily accessible. Since these components do not call for very high adjustment accuracy, maintenance or replacement can take place easily and rapidly.

In a preferred construction the light source housing can be suspended in a fixing element attached to the module housing, whereby the entire light source housing can rapidly be replaced if necessary.

The construction according to the invention of the module housing thus offers considerable maintenance and space advantages.

An advantageous further development can consist in the module housing comprising a rear wall, which is arranged opposite the front side, and at least two side walls disposed opposite connecting the front side to the rear wall, wherein the rear wall comprises at the transition point with the first side wall the chamfering, opening or cutout, and in the second side wall the cutout for the light transmissive picture generator is disposed. This construction can be produced without complications in manufacturing terms. The side wall in which the cutout for the light transmissive picture generator is disposed can moreover be a horizontally, vertically or else obliquely running wall surface of the module housing. It is particularly advantageous if the chamfering opening or cutout extends in a vertical direction through the rear wall and the first side wall. In this construction the side wall with the cutout for the light transmissive picture generator runs in the vertical direction and the light source housing is disposed on the rear-side end of the wall disposed on the other side. With such an arrangement it is possible with simple structural measures to achieve a space-saving arrangement in which the components can be maintained and replaced particularly easily.

In order to reduce the overall depth of the rear projection module or of the light source housing or to permit maintenance of the light source without removal of the light source housing, it may be advantageous if a light-deflecting mirror is disposed in the light source housing and the light source of the illumination unit is accessible from the rear side of the rear projection module. A defective light source can rapidly be exchanged in this way.

With known rear projection modules at least one image deflecting mirror, arranged in the imaging path between the projection unit and the projection screen, can be provided, in order to reduce the overall depth of the rear projection module. High demands must be made of the optical quality of the mirror, and good results can be obtained only with plane glass mirrors of high planarity. An arrangement which uses two such image deflecting mirrors is known from the document U.S. Pat. No. 5,048,949. It is not possible to meet very high precision requirements with known arrangements of image deflecting mirrors, in particular in the case of rear projection modules which are constructed according to the invention with projection screens or module housings capable of being respectively strung together or overlapping essentially web-free.

Both the mechanical and the optical components of a rear projection module possess, in fact, unavoidable manufacturing tolerances which can have a disadvantageous effect on the optical quality achievable. The freedom from distortion of the image displayed by a rear projection module is of particular importance here. In an individual rear projection module the distortion of the displayed image is of minor importance, since even significant distortions escape the eye of an observer.

The situation is quite the reverse if several rear projection modules are strung together in order to display a large image composed of subsidiary images. In this case straight lines are present in the image which pass through adjacent projection screens. Even very slight distortions are then immediately noticeable, since the junction of the straight lines at the transition points from one subsidiary image to an adjacent one is staggered in form. The freedom from distortion must thereby be extremely high and should be less than 0.1%, referred to the image diagonal, or less than 1/10 of the picture element size or of the picture element spacing.

This precision requirement cannot be fulfilled without adjustment means even with modern projection technologies, since among other things both the mirror and the support to which the latter is attached are not sufficiently plane. In the context of the invention it has been found that in order to compensate for imaging errors and residual distortions due to the non-planarity of the mirror and due to manufacturing tolerances, for example in the projection unit, it can be provided with advantage that at least one image deflecting mirror comprises on its rear side, distributed over its surface, several adjustable adjustment elements which are adjustable individually in a variable length, with which the mirror surface of the image deflecting mirror is variable slightly in its curvature. By adjustment of the adjustment elements it is then possible to compensate for residual distortions caused by the projection unit, the non-planarity of the mirror and other mechanical inaccuracies in the rear-projection module. The adjustment paths of the adjustment elements are very small and are typically below 1 mm.

A preferred construction is that four adjustment elements are provided. Three adjustment elements are not sufficient to effect a distortion correction on the entire surface of the projection screen, for which reason at least four adjustment elements are required. A higher number of adjustment elements is certainly possible, but scarcely necessary in practice. The four adjustment elements are arranged with advantage in the corner points of a rectangle, since the image has a rectangular format. It is particularly advantageous if the ratio of the side lengths of the rectangle corresponds to that of the image format.

With an image deflecting mirror adjustable according to the invention and reducing the overall depth of the rear projection module, residual distortions can be compensated for in a repercussion-free manner decoupled from the other components. A preferred construction for achieving distortion-free imaging consists in there being disposed between the light transmissive picture generator and the projection screen only one image deflecting mirror and the image deflecting mirror being positioned essentially vertically. The vertical positioning means in this context that there is in the mirror plane a straight line running in the direction of the gravitational force. If the mirror is slightly curved, this refers to an averaged mirror plane. Essentially vertically means that the angle between this straight line and the gravitational force is to be less than 10°, preferably less than 5°. In the context of the invention it has been found that with non-vertically arranged image deflecting mirrors gravitation causes distortions in the image deflecting mirror, which have a disadvantageous effect on the optical imaging. The distortions caused by the gravitational force are reduced or eliminated completely by the measure according to the invention.

In order to obtain a particularly short overall depth of a rear projection module, in particular of a rear projection module stringable together essentially web-free or of a rear projection module with at least one image deflecting mirror, it is further proposed that the projecting lens of the projection unit should have an intercept length which lies in a range of 10% less to 10% greater than the image diagonal of the projection screen. By intercept length is meant the distance between the optical principal plane of the projecting lens and the projection screen, that is to say the image.

According to the state of the art the intercept length is more than 20% greater than the image diagonal. The reason for this lies in the fact that it has not been considered possible to date to achieve the required imaging quality with smaller intercept lengths. It has been found surprisingly in the context of the invention that projecting lenses with a large aperture can also be achieved in the required quality with small intercept lengths without technical problems. High quality standards of the optical imaging can be met in particular with the further measures according to the invention for improving the rear projection module, above all in relation to the illumination unit. The intercept length should however not be more than 10% smaller than the image diagonal, since in this case the optical properties of the Fresnel lens, in particular its Fresnel structure, lead to an increased formation of ghost images.

In the case particularly of a construction according to the invention of the projection screen with a support element it is advantageous if the intercept length of the projecting lens is short, since in this way not only is a reduced overall depth of the rear projection module achieved, but also a small angle of the light ray corresponding to the picture element closest to the edge relative to the support sheet (corresponding to a large angle relative to the optical axis), measured on the light input side of the support sheet. In this way the material thickness of the support element and/or of the fixing part and hence also the strength can be high. In the case of a fixing part of wedge-shaped construction a large wedge angle is thus made possible and the stability optimised.

A further advantageous construction feature exists in the fact that the projecting lens is a lens with a virtually fixed focal length, which can be set to vary by more than 0.01% but less than 0.5% In this way manufacturing tolerances of the projecting lens and other components of the rear projection module can be evened out, and the image size can be adjusted to the size of the projection screen.

A general problem with projectors for projecting an image onto a large-area projection screen, which include a light transmissive picture generator for displaying the image on a reduced scale, an illumination unit for the trans-illumination of the light transmissive picture generator and a projection unit for the magnified imaging onto the projection screen of the image depicted by the light transmissive picture generator, in which the illumination unit comprises a light source, a reflector and a condenser for the illumination of the light transmissive picture generator, consists in the decrease of the brightness from the centre of the image to its edge and to its corners. This phenomenon is referred to in technical circles as "hot spot".

This decrease in light is determined by the physical properties of the optical components, a particular contribution being made to this phenomenon by the illumination unit, and in particular the lenses of the condenser. A conventional, spherical condenser lens illuminates the light transmissive picture generator according to a cosine law. In addition the light efficiency of known projectors is also not satisfactory.

Conventional projectors, such as overhead projectors, slide projectors or rear projection modules, for example, consequently exhibit a highly irregular distribution of the brightness. In most cases this is not a problem, however, since even strong differences in intensity are scarcely noticeable by a human observer in the case of a single displayed image.

The situation changes at once, however, if subsidiary images each projected by a particular projector are arranged at the side of or above one another in order to represent a composite overall image. With such an arrangement an observer notices even a small drop in intensity in the subsidiary images from the centre to the edges. The overall image then appears patchy, with a bright area in the centre of each of the subsidiary images, the hot spot, and a pattern of striped or chessboard-like appearance in the transition areas between the subsidiary images. This phenomenon is also known with known rear projection modules placed side-by-side, where no solution has been found to date for this luminous intensity problem, which is due to the modularity of the overall image and represents a central difficulty.

The difficulties with the decrease in intensity towards the edge of the image also increase considerably with rear projection modules strung together, if projection screens constructed essentially web-free are strung together according to the invention, since in this way the virtually web- and seamless connection of the subsidiary images cannot take full effect, in particular if, as is possible in the context of the invention, light transmissive picture generators with large image diagonals, projecting lenses with short intercept lengths, projection screens with large image diagonals or generally large apertures are used.

In the course of the optimization of the rear projection module according to the invention it was found, surprisingly, that these disadvantages, including in the case of the general projectors described above, can be avoided if the condenser comprises a free-form condenser lens.

A free-form condenser lens is a non-rotationally-symmetrical condenser lens whose optical area can be calculated on the basis of physical-mathematical models. If a particular light source intensity distribution is posited in advance, the models can allow for the most varied influences of the optical components, in order to calculate a form of the free-form condenser lens which is suitable for obtaining desired imaging properties, for example in relation to brightness distribution and intensity. For example, the lens surface of a free-form condenser lens can be represented by spline surfaces and the calculation carried out by optimization of a surface effect of a spline surface determined by control points in the B-spline representation by means of the Gauss-Newton method, which makes use of known algorithms from numerical mathematics and the theory of spline surfaces.

The free-form condenser lens can be so constructed that the decrease in light towards the edge is compensated for at least partly or almost completely by the intensity distribution being exaggerated towards the image edge by the free-form condenser lens in such a way that on the whole a virtually uniform brightness is obtained during the imaging. The influences of all or of individual optical components that have to be allowed for in individual cases, but in particular their decrease of light in the edge areas, can also be taken into account by modelling during the computation of the free-form condenser lens, depending on the requirements concerning the optical imaging quality to be achieved, in which freedom from distortion, clarity of imaging and its uniformity across the image and also colour uniformity all play a part.

The free-form condenser lenses have in addition the further advantages that they can be manufactured particularly cheaply, for example by means of press moulds, have a small overall size and do not require high accuracy of adjustment relative to the light source.

These advantageous properties of a free-form condenser lens are also of advantage with general projectors. Particularly with overhead projectors in which light transmissive picture generators with an image diagonal of more than 21 cm, in particular more than 26 cm, are used, the quality of the optical imaging can be improved considerably with a free-form condenser lens. A conventional overhead projector for projecting an image comprises, in the sequence of the light propagation, a light source, a reflector, a condenser lens, a Fresnel lens, a light transmissive picture generator and a projecting lens. According to the invention the condenser lens is replaced by a free-form condenser lens.

A particular advantage of free-form condenser lenses in projectors, in particular in rear projection modules previously known or according to the invention, consists in the fact that interfering effects of the light source can be evened out. It has been found in the context of the invention that peculiarities of the light source, such as the nonpunctiform extension of the focal spot, reflexes on the outer bulb, colour separation phenomena and in some cases pole caps, return wires or flash welds, may lead to an irregular distribution of the light, and these can be evened out to a high degree by means of the free-form condenser lens.

According to a further advantageous feature it is proposed that the reflector of the projector should have an elliptically curved surface axially symmetrical to the optical axis. The luminous intensity can be increased by improving the light efficiency in this way. Current projectors use parabolically formed reflectors, since the optical properties of elliptical reflectors are far more disadvantageous in terms of the equal distribution of light. It has been found in the context of the invention that these disadvantages can be eliminated by the combination with a free-form condenser lens, and a major exploitation of the light radiated by the light source is possible. There can be achieved with the light efficiency in this case solid angles of over 72%. of 4 Pi combined with a more regular distribution of the luminous intensity. Known projectors achieve only about half of this solid angle, still with poorer luminous intensity distribution.

According to a further preferred feature it is proposed that the free-form condenser lens be so constructed that the light distribution generated by the reflector is converted by means of the free-form condenser lens into a light distribution adjusted to the rectangular format of the image or of the light transmissive picture generator. During the conversion light components that lie outside the object format are transferred into the object format. Even if the light falling outside the object format cannot be converted completely into the object format, an increase in intensity is nevertheless achieved.

The illuminated surface cannot be adjusted to the object format with axially symmetrical condenser lenses. Condenser lenses are known from the prior art which consist of two segmented lenses arranged behind one another, with each segmented lens comprising a large number of small segments. In combination with a parabolically shaped reflector the distribution of light over a rectangular object format can be achieved by this arrangement, in order to increase the light efficiency. This arrangement has the disadvantage that it has a large overall length and the cosine decrease in the luminous intensity at the edge is not corrected. The light efficiency with the parabolically shaped reflector is also not optimal. The construction according to the invention avoids these disadvantages.

A projector with a free-form condenser lens constructed according to the invention, for example a rear projection module with a projection screen with a diagonal of more than 50 cm, an intercept length of the projecting lens of less than 150 cm, a light transmissive picture generator with an image diagonal of about 10 inches, an expansion of the focal spot of the light source of about 4 mm and an elliptically shaped reflector can, in order to improve the optical quality, be constructed in such a way by optimization of the free form condenser lens that the luminous intensity of the projected image deviates by less than 25%, preferably by less than 15%, from a mean value. This is the case in particular with the use of liquid crystal display units as light transmissive picture generators. The projecting lens can with advantage be so constructed that the distortion of the projected image is less than 0.1%.

The contrast and the contrast distribution of liquid crystal display units are highly dependent on the angle of the incident light. With known projectors a condenser, for example a Fresnel condenser, is introduced into the ray trajectory in front of the liquid crystal display unit. This condenser then bundles the light through the light transmissive picture generator onto the projecting lens. For this reason the light rays pass through the light transmissive picture generator at an angle increasing towards the edge of the light transmissive picture generator, wherein the angle relative to the optical axis in the edge areas is the greater the greater the image diagonal of the light transmissive picture generator is. This leads to an augmented decrease in contrast from the centre of the image to the edge, particularly in the case of liquid crystal display units.

These disadvantages are avoided by the proposed construction of the projection unit, which comprises a Fresnel lens disposed on the light output side of the light transmissive picture generator, since this permits a trans-illumination of the light transmissive picture generator which is parallel to the optical axis. The Fresnel lens, just like the condenser or Fresnel condenser, should be disposed as close as possible to the light transmissive picture generator, in order that the light may efficiently be bundled onto a projecting lens arranged at a greater distance from the light transmissive picture generator.

According to a further advantageous feature it is proposed that the Fresnel sheet be taken into account in the specification of the projecting lens. The Fresnel lens is in so doing regarded as part of the projecting lens of the projector and varied in the course of its modular representation, just like the other parameters of the projecting lens, in order to optimize the imaging properties. In this way a sharp, largely distortion-free imaging can also be achieved with a Fresnel lens. If the Fresnel field lens is not allowed for in the calculation of the projecting lens, the brightness of the image will certainly be increased, but not the freedom from distortion and the imaging sharpness.

A preferred construction consists in the Fresnel structure of the Fresnel lens being disposed on the side facing the light transmissive picture generator, since the quality of the optical imaging can then be better than in the opposite case. If the condenser comprises a Fresnel condenser in a preferred construction, it is also of advantage in this case if the Fresnel structure of the Fresnel condenser is disposed on the side facing the light transmissive picture generator.

The advantages of a rear projection module according to this invention compared with the prior art consist in the fact that subsidiary images of individual modules can be strung together essentially web-free. At the same time an equal distribution of the imaging sharpness and the brightness from the centre of an image right into the corners and edge areas can be achieved. The images also possess considerable brightness, despite not very high performance levels of the light source, and are free of distortions and deformations to a very large extent. The rear projection modules can be so constructed that the overall depth is small and maintenance operations can easily be carried out. The individual measures according to the invention can be applied individually or else with advantage in combination with each other, and additional advantageous effects can also be obtained by the combined effect of features according to the invention. Some measures discovered in the context of the invention for the improvement of known rear projection modules can also be used with advantage in general projectors.

The following embodiments of the invention show further advantageous features and peculiarities, which are described in greater detail and explained below by means of the diagrammatic representation in the drawings.

Figure 2:
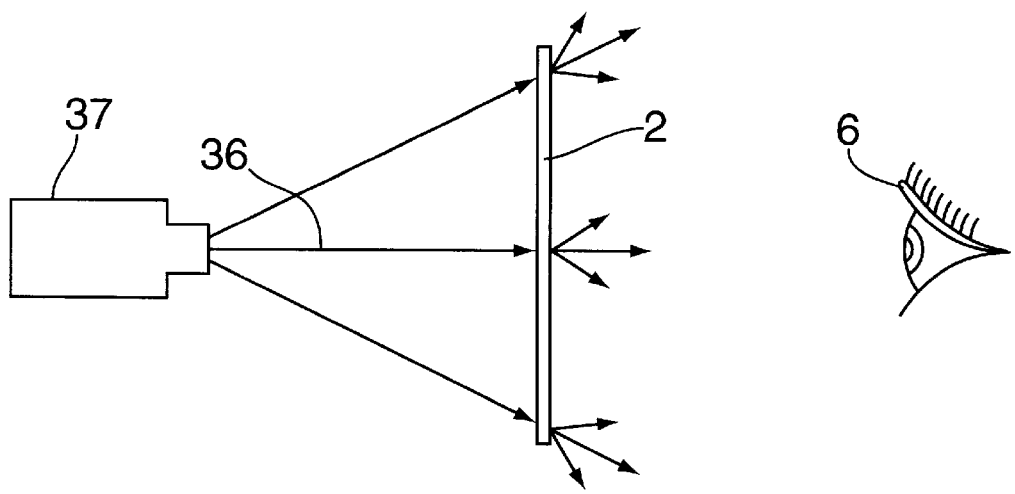
Figure 3:
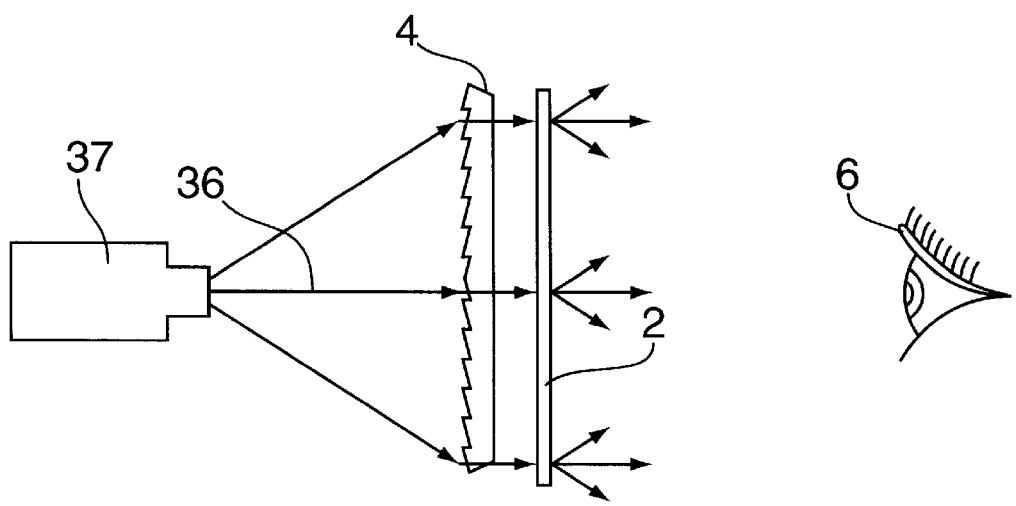
Figure 4:
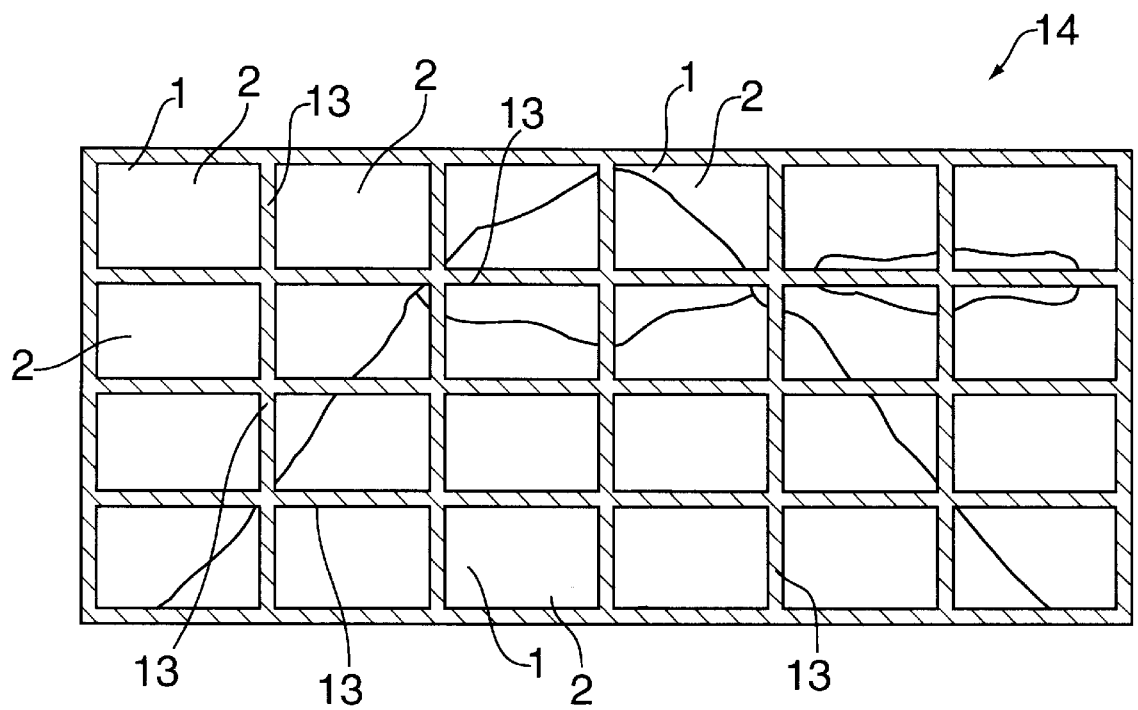
Figure 5:
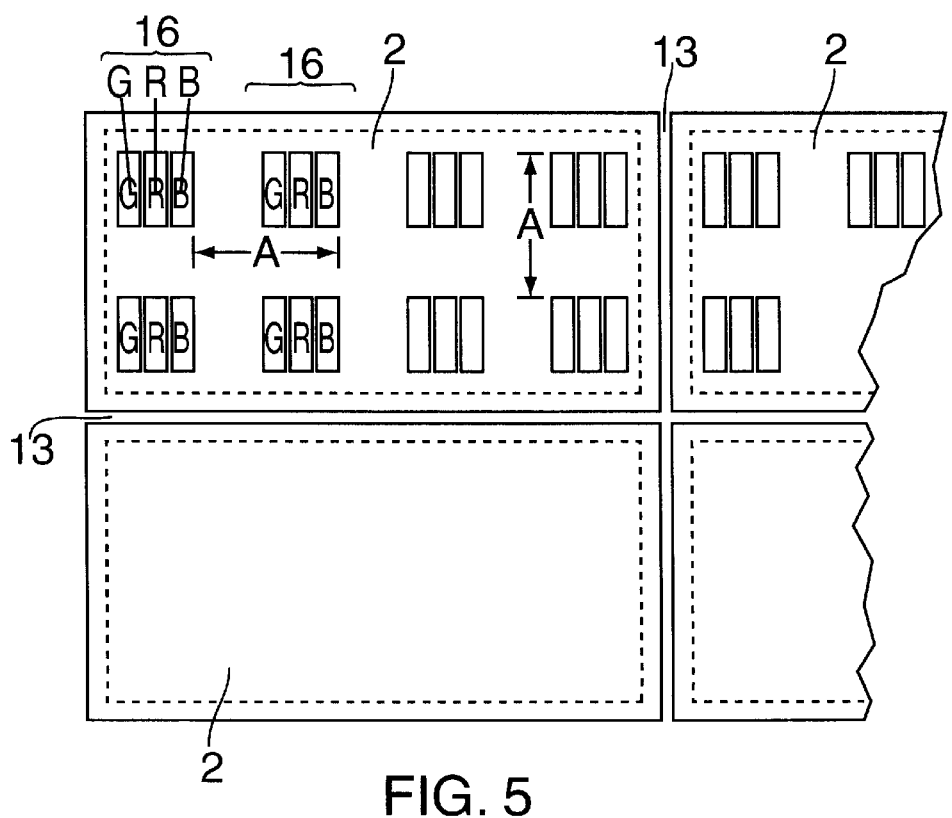
Figure 6:
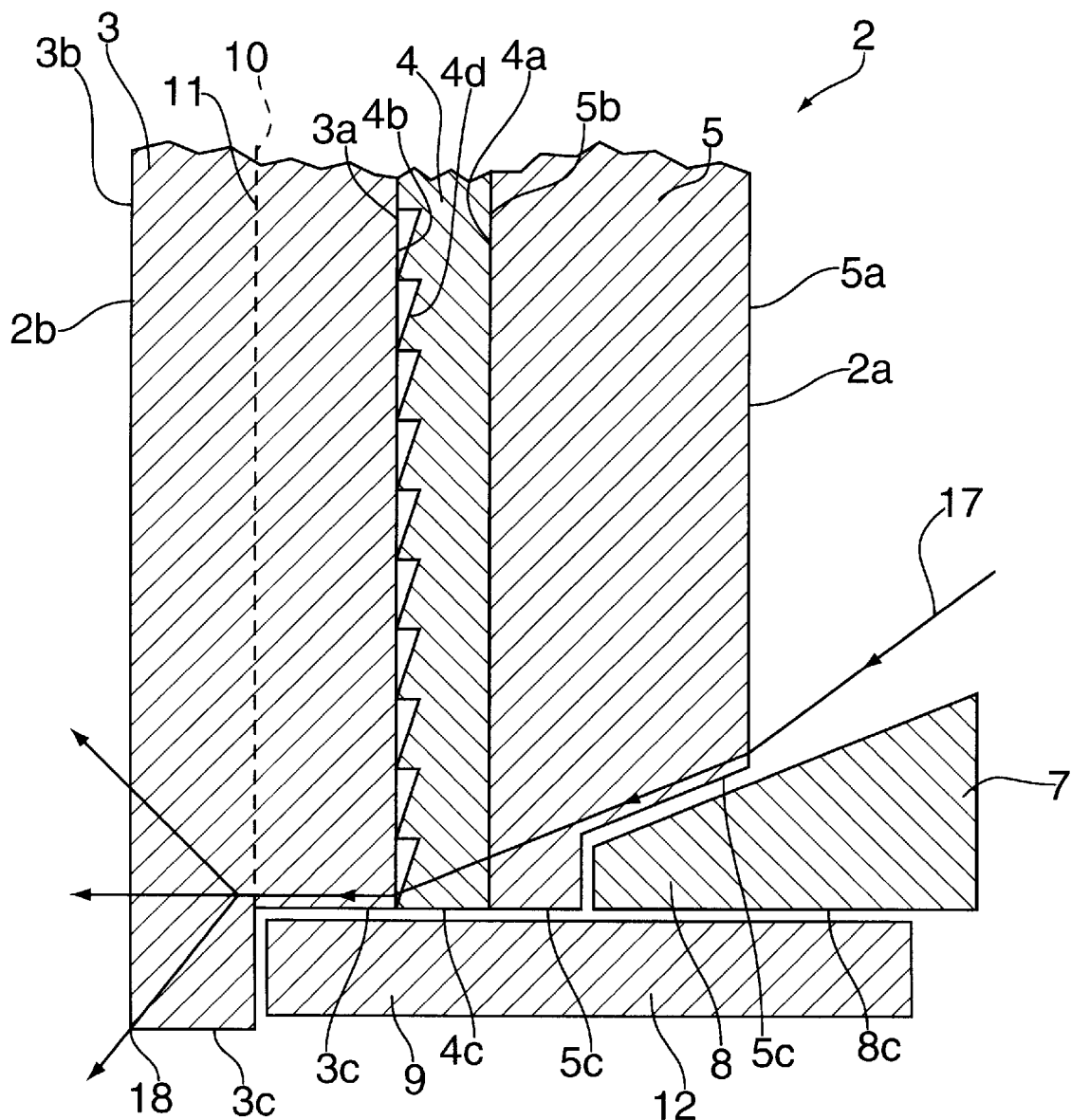
Figure 6A:
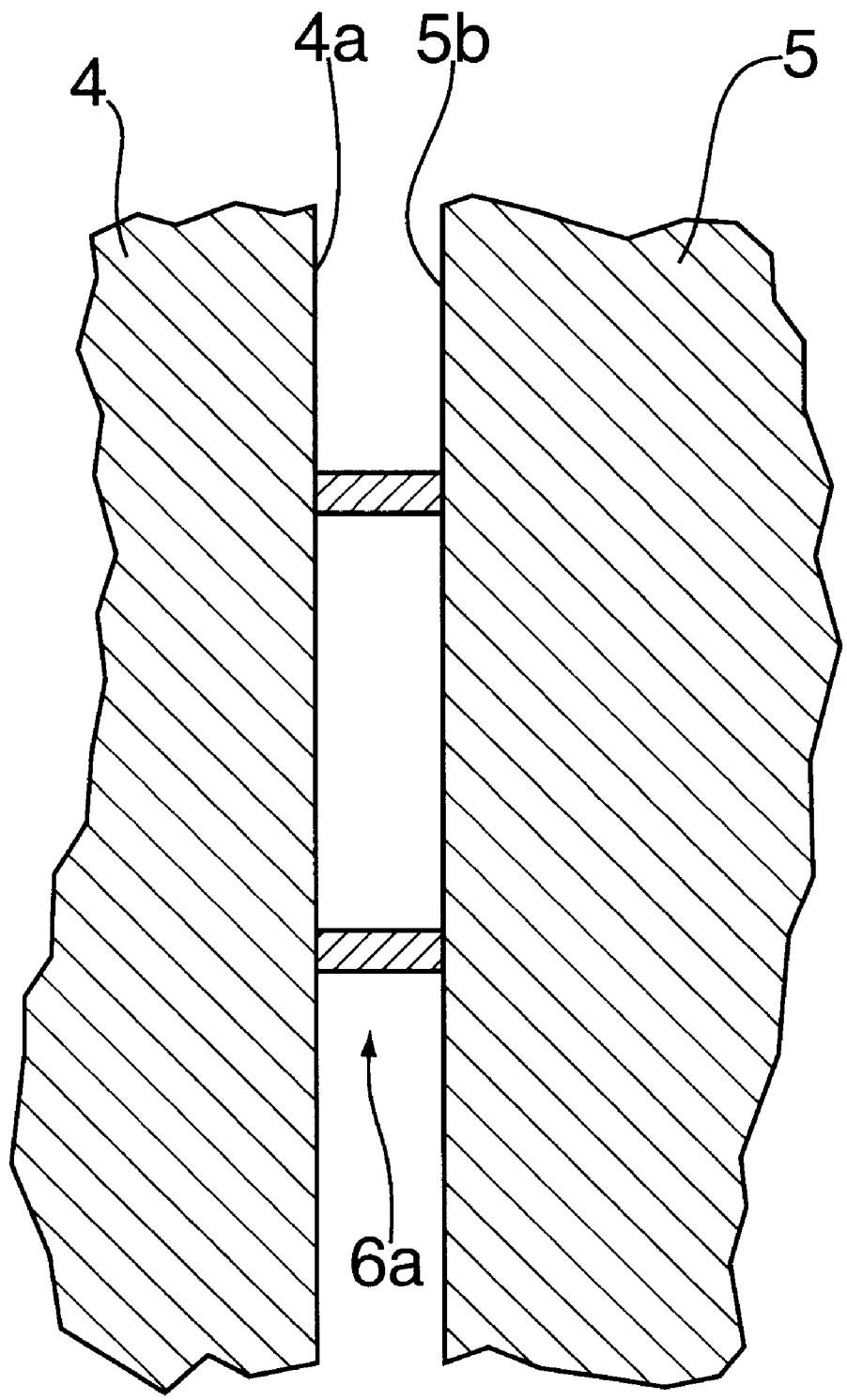
Figure 7:
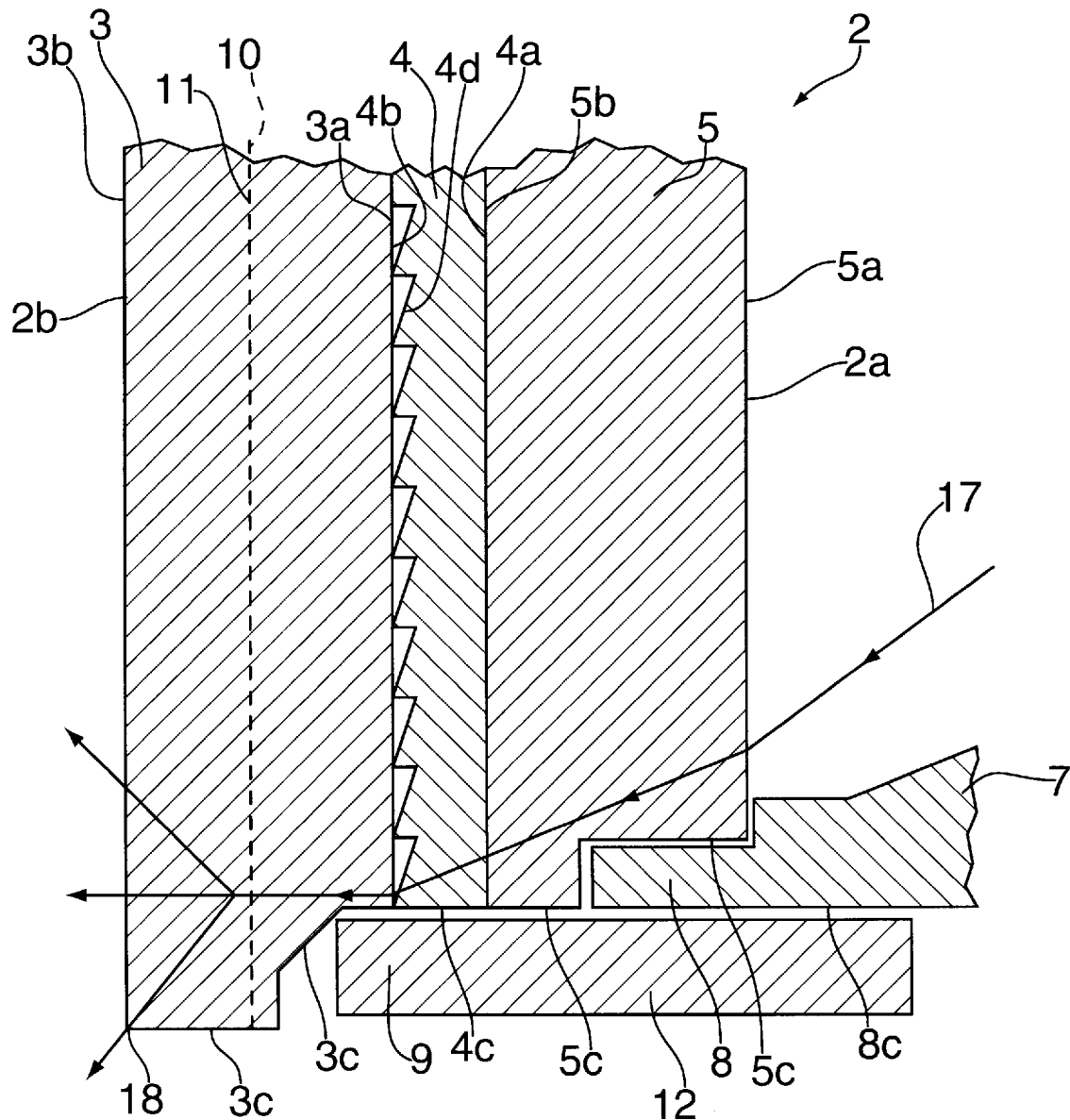
Figure 8:
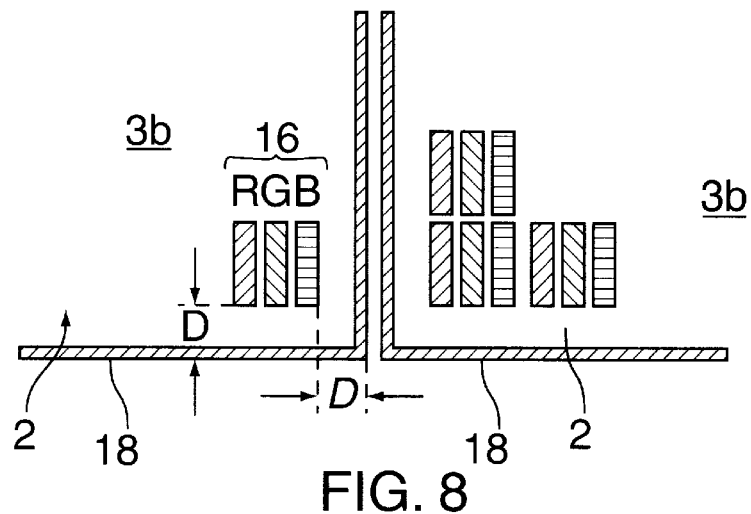
Figure 12:
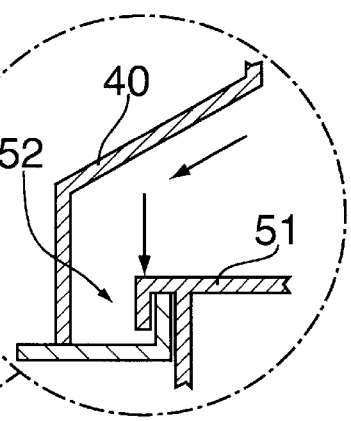
Figure 11:
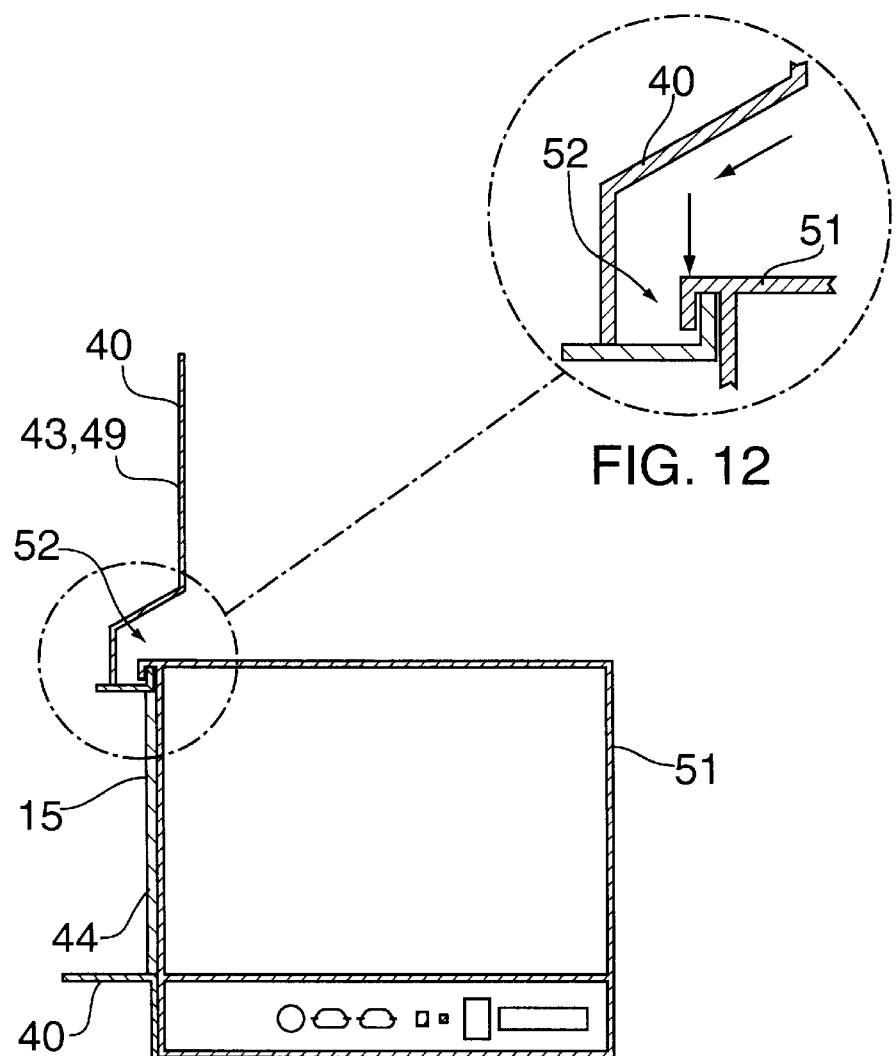
Figure 9:
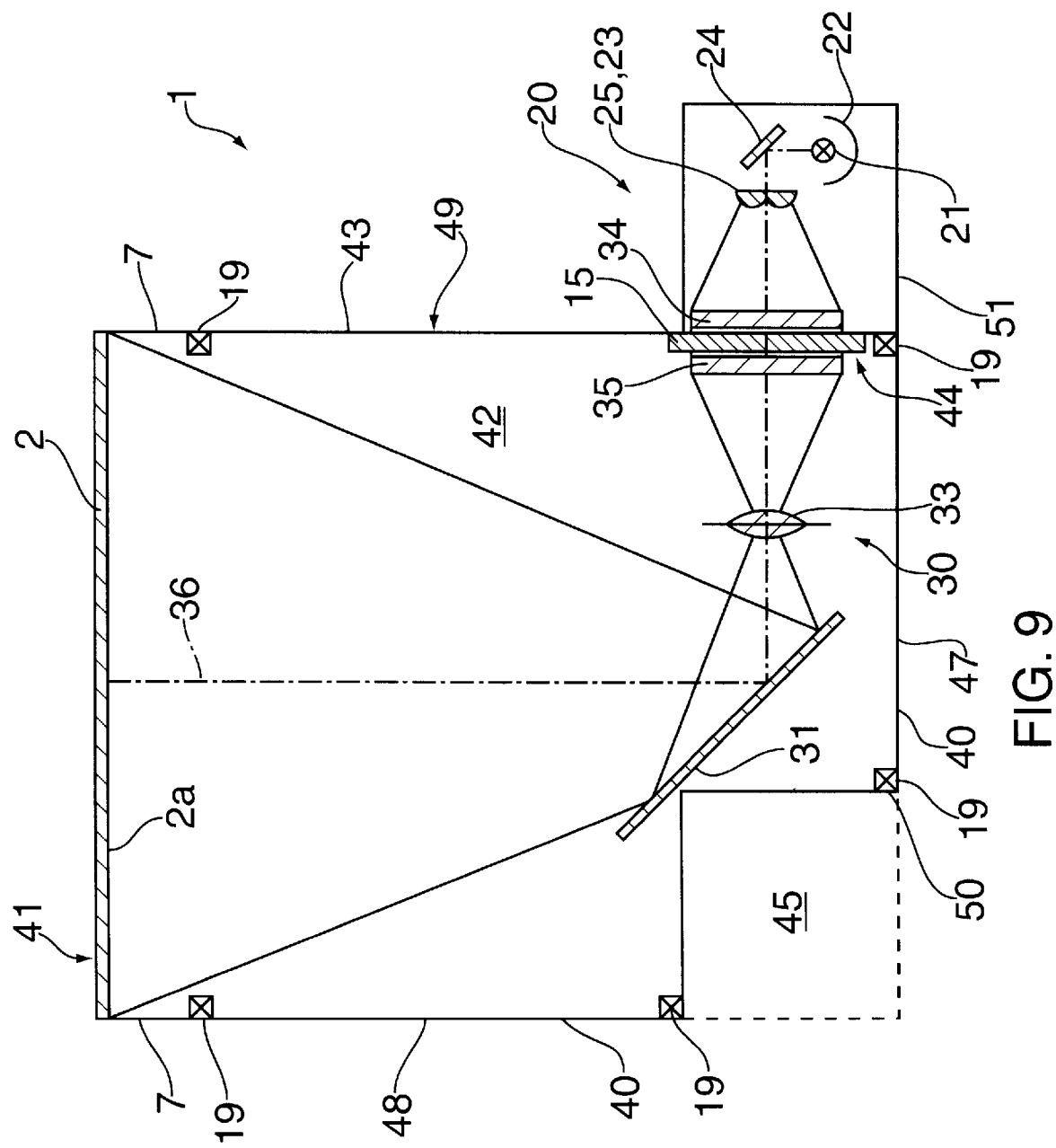
Figure 13:
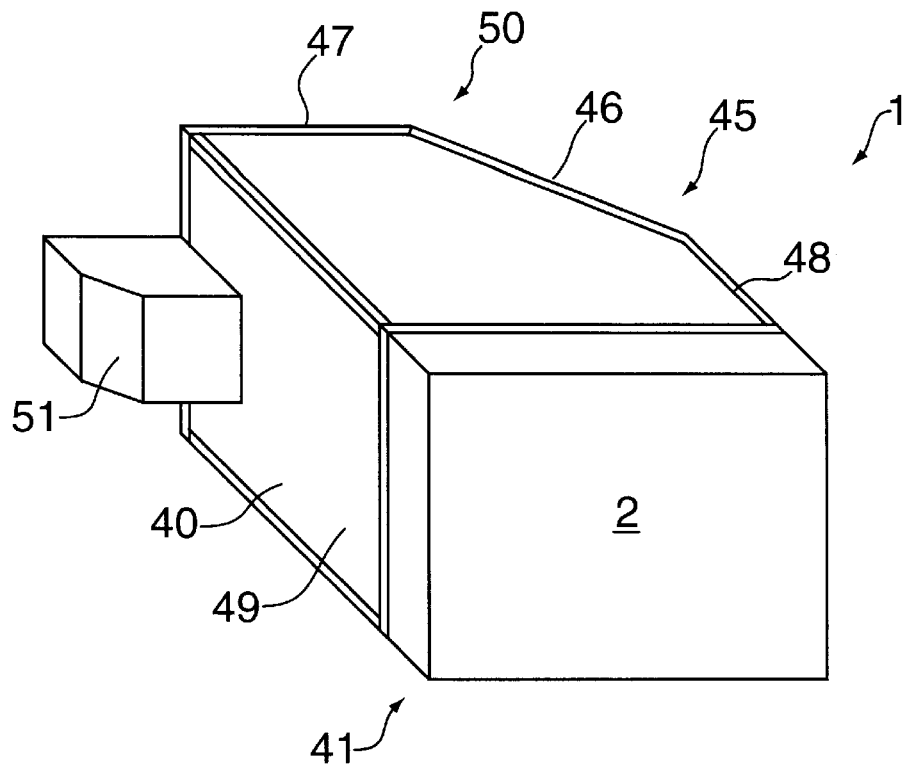
Figure 14:
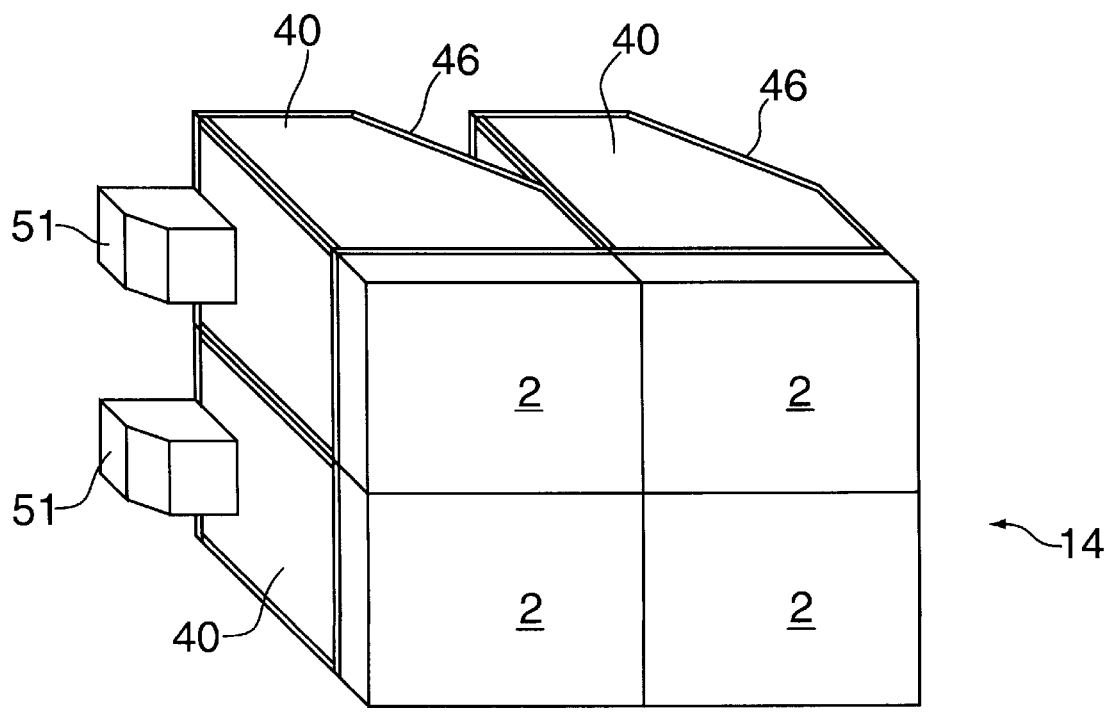
Figure 15:
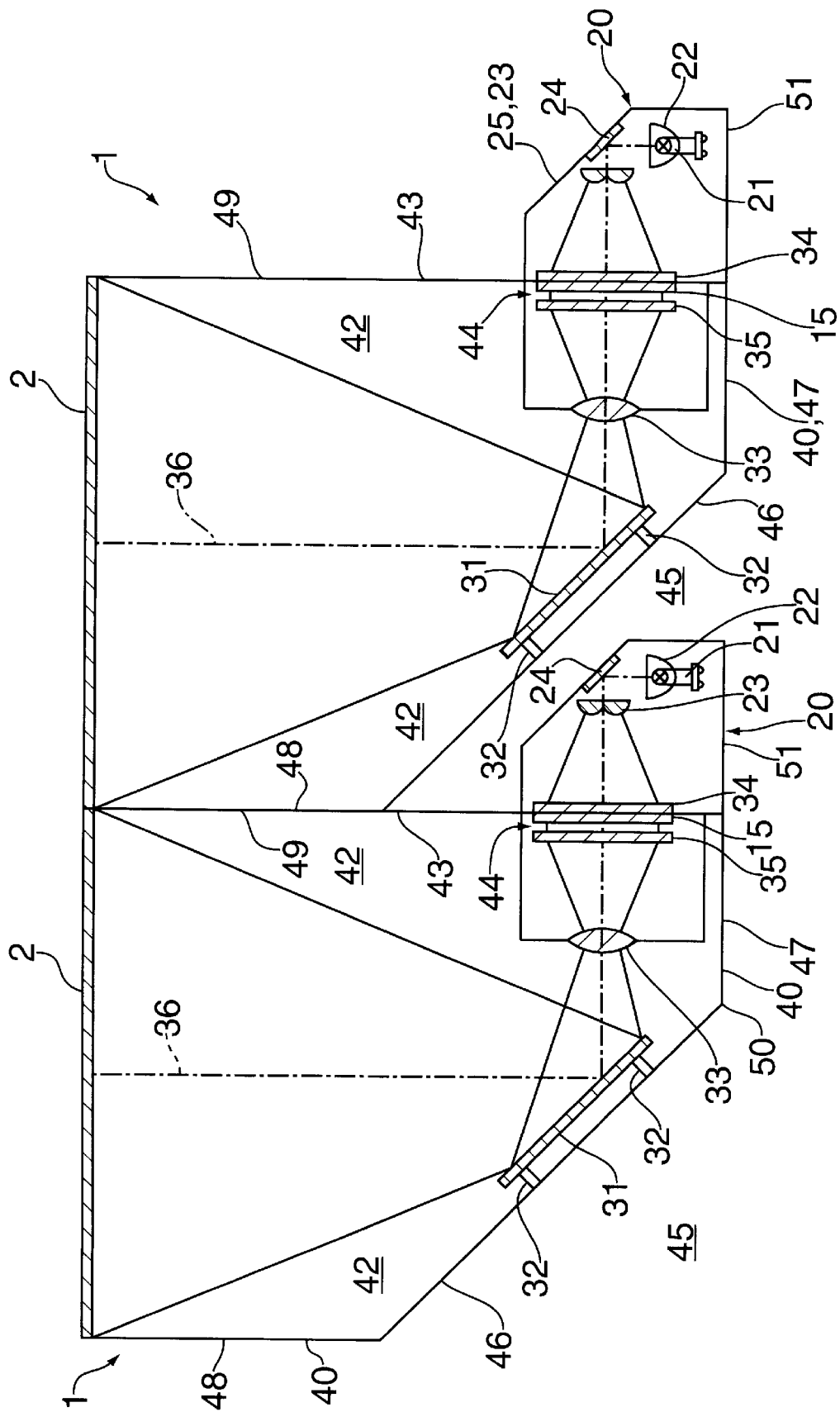
Figure 16:
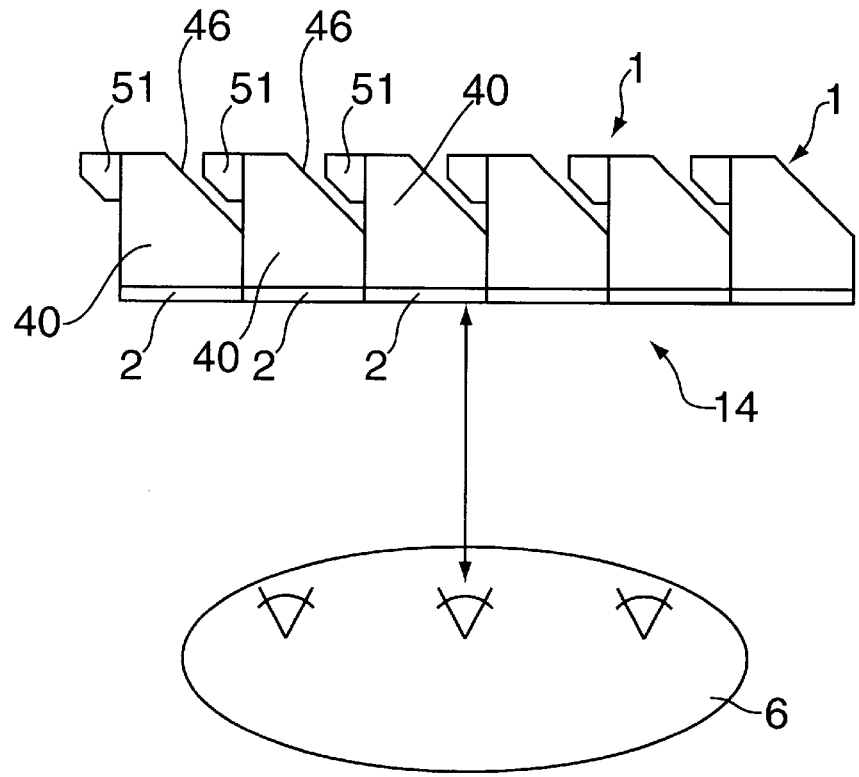
Figure 17:
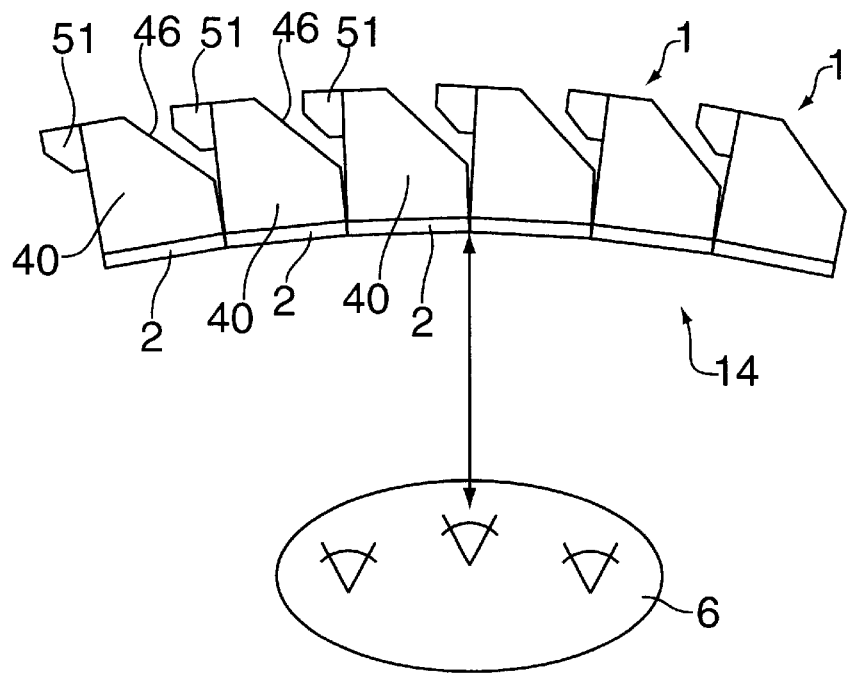
Figure 18:
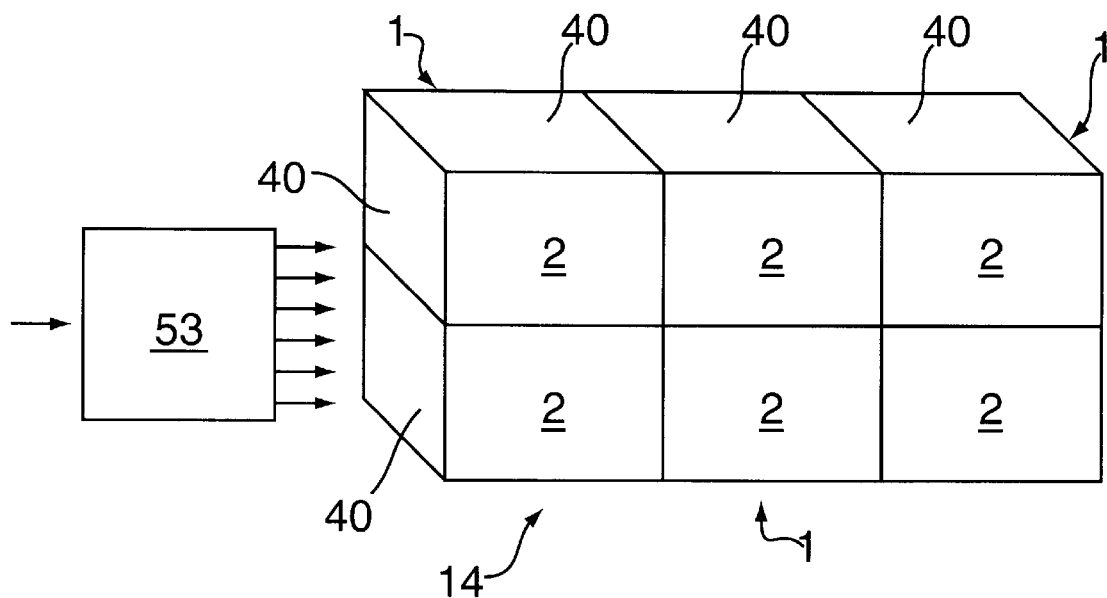
Figure 23:
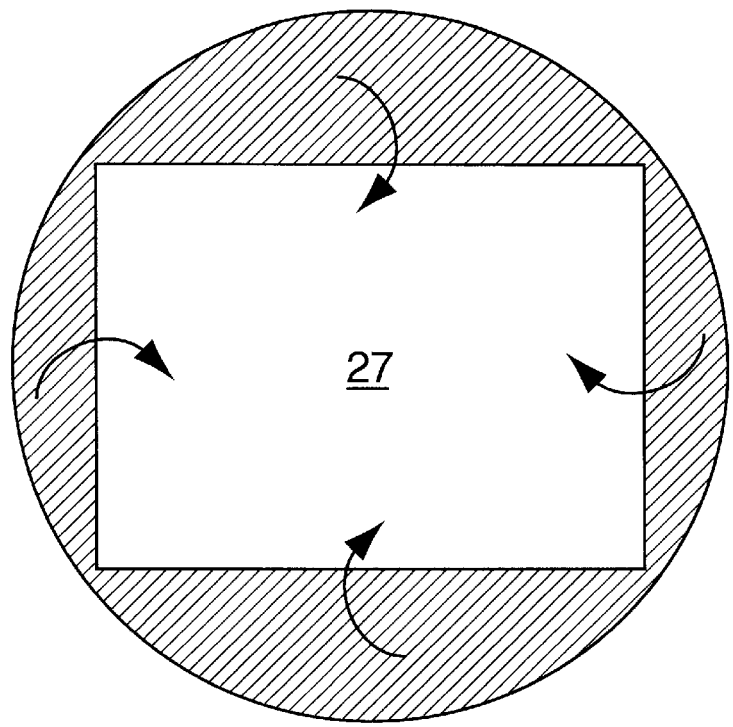
Figure 19:
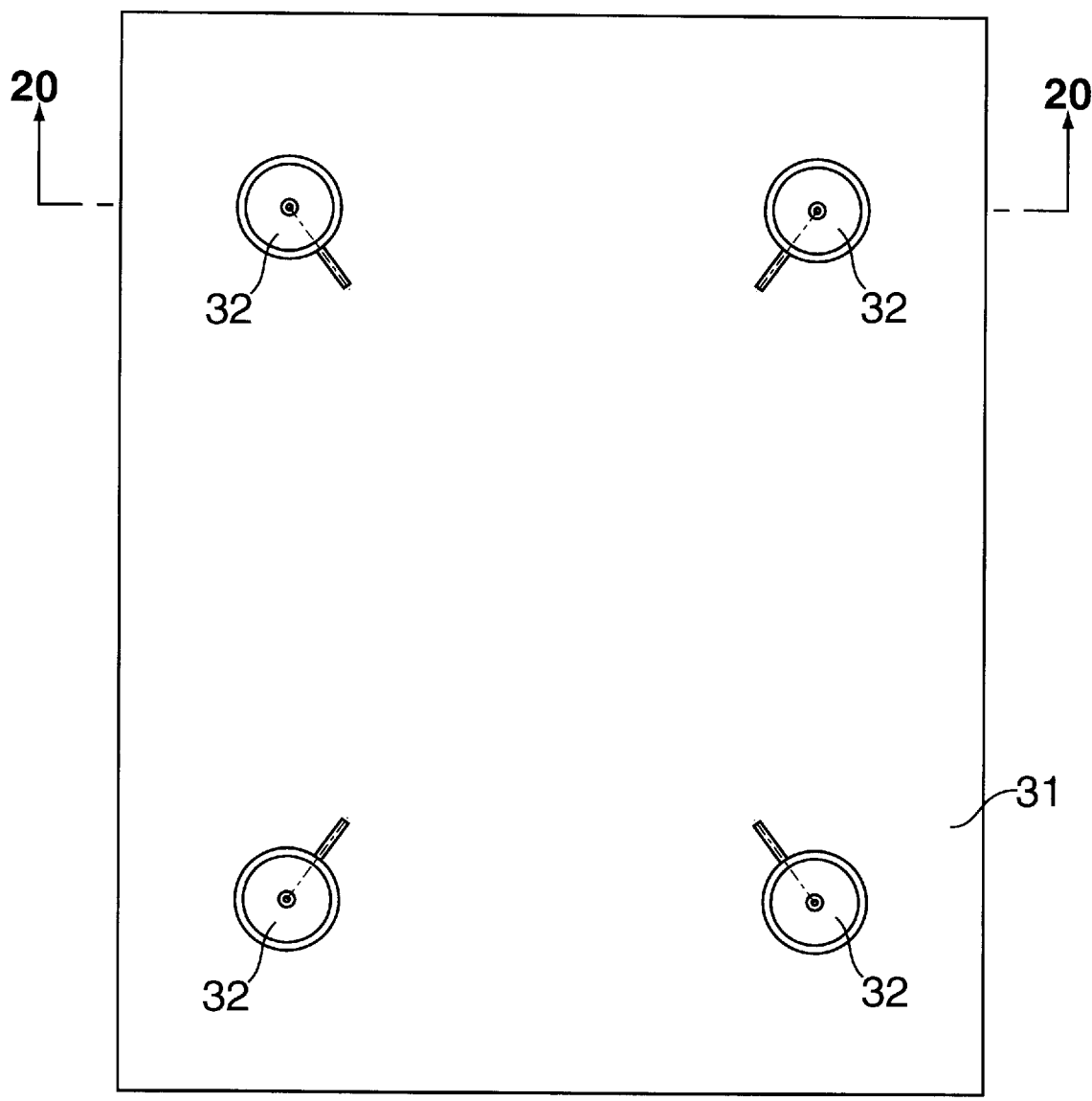
Figure 20:
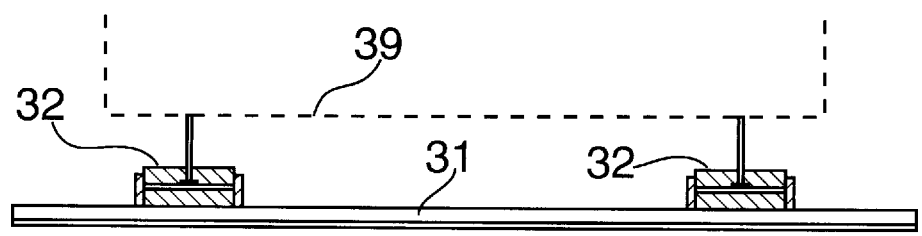
Figure 21:
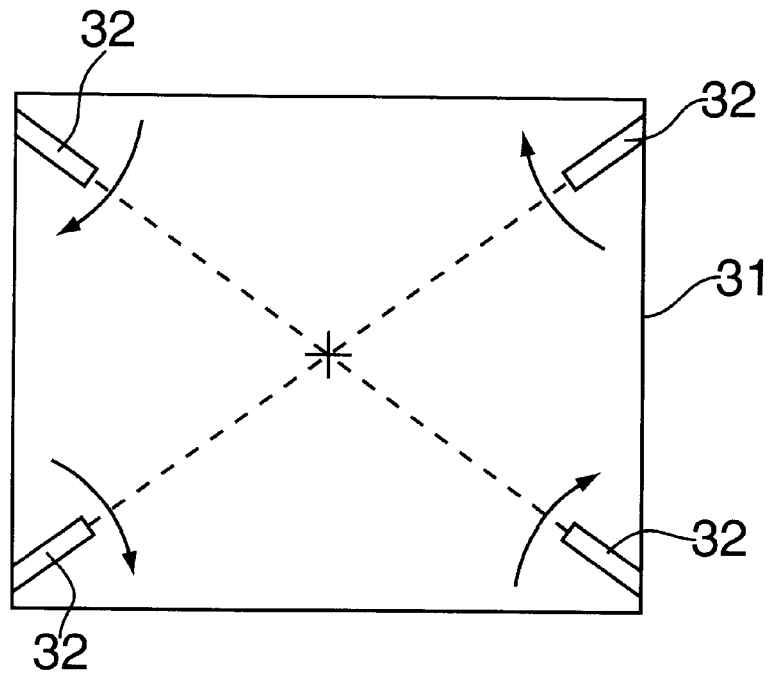
Figure 22:
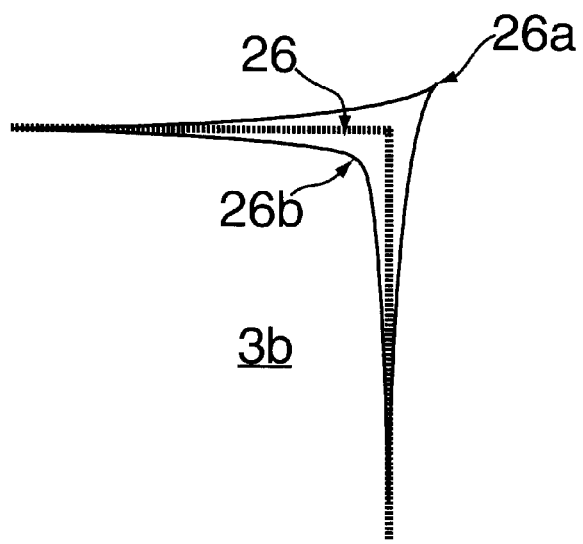
Figure 25:
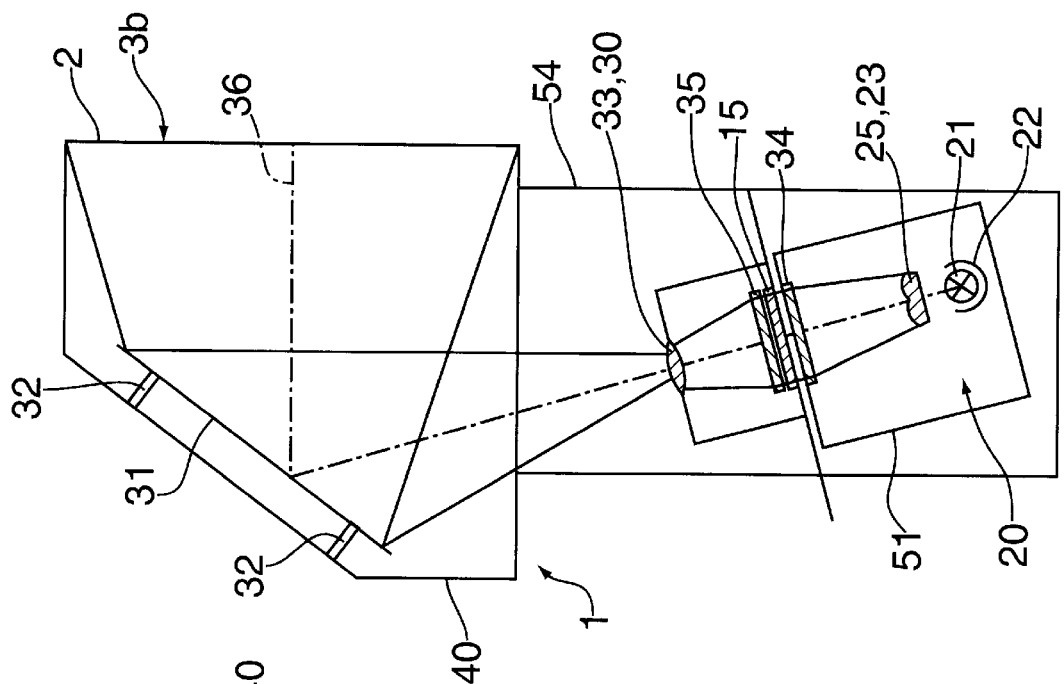
Figure 24:
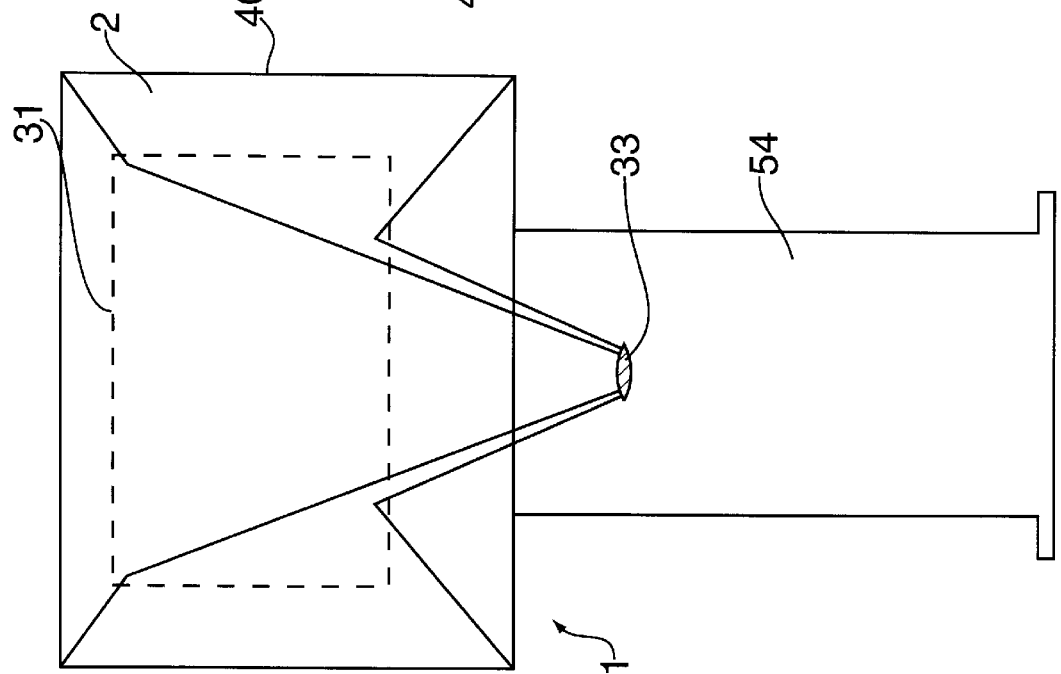

FIG. 1 shows a diagrammatic representation of a projector,

FIG. 2 a diagrammatic representation of a rear projection by means of a projector, FIG. 3 a diagrammatic representation of an improved rear projection by means of a projector, FIG. 4 a view onto a known large-image rear projection screen, FIG. 5 a detail from FIG. 4, FIG. 6 a diagrammatic section through a projection screen according to the invention, FIG. 6a a detail of FIG. 6, FIG. 7 a modification of FIG. 6, FIG. 8 a detail from FIG. 7, FIG. 9 a horizontal section through a rear projection module according to the invention, FIG. 10 a detail from FIG. 9, FIG. 11 a detail from FIG. 10, FIG. 12 a detail from FIG. 11, FIG. 13 a module and light source housing according to the invention, FIG. 14 four module and light source housings according to the invention, FIG. 15 a horizontal section through FIG. 14, FIG. 16 a view onto rear projection modules placed side by side, FIG. 17 a view onto rear projection modules placed side by side polygonally, FIG. 18 a diagrammatic view of six rear projection modules, FIG. 19 the rear side of an image deflecting mirror, FIG. 20 a section through FIG. 19, FIG. 21 a diagrammatic view of FIG. 19, FIG. 22 a detail of FIG. 21, FIG. 23 the light distribution variation of a freeform condenser lens, FIG. 24 the front view of a modified rear projection module, FIG. 25 a cut-away side view of FIG. 24 and FIG. 26 various equations for a free-form condenser lens.

FIG. 1 shows a diagrammatic representation of a projector 37 according to the prior art for the projection of an enlarged image of a light transmissive picture generator 15. The light transmissive picture generator 15 can be for example a slide, a film or a liquid crystal display unit. The light transmissive picture generator 15 is illuminated by the light source 21. In order to utilize as large a part as possible of the light emitted by the light source 21, a special illumination unit 20 is used. A substantial part of the light radiated rearwards reaches the light transmissive picture generator 15 by means of a reflector 22. Between the lamp 21 and the light transmissive picture generator 15 is located the condenser 25, which can consist of several condenser lenses. On the light output side of the condenser 25 the light rays are not parallel to the optical axis 36, but convergent.

The image of the light transmissive picture generator 15 is projected enlarged onto a projection screen (not shown) by the projection unit 30, which comprises at least one projecting lens 33. In the case of an incident-light projection screen the image is viewed from the side of the projection screen on which the light impinges. With rear projection the projected image is viewed from the side of the projection screen lying opposite the light incidence side. With an overhead projector a light deflecting mirror is in most cases also located between the projecting lens 33 and the projection screen in the imaging ray path.

FIG. 2 shows a diagrammatic representation of a rear projection by means of a projector 37 onto a projection screen 2. The angle-dependent intensity distribution of the picture elements is indicated by arrows on the light output side of the projection screen 2. It will be seen that an observer 6 disposed on the optical axis 36 will also notice that the brightness decreases towards the edge and the corners of the image. If the position of the observer 6 changes, in particular in the event of a movement perpendicular to the optical axis 36, the intensity distribution alters significantly. The brightness, which is dependent on the angle of view, causes a problem particularly in the case of large projecting screens composed of several projection screens 2, since several projection screens 2 are observed simultaneously there, but from different angles of view.

FIG. 3 shows a diagrammatic representation of an improved rear projection in accordance with FIG. 2 by means of a projector 37, where a Fresnel sheet 4 is additionally disposed in front of the projection screen 2. A brightness which is more regular for an observer 6 from a particular angle of view can be brought about in this way.

FIG. 4 shows a diagrammatic representation of the image displayed by a large projecting screen 14. The image consists of several subsidiary images, which are each displayed on projection screens 2 by rear projection modules 1. It is clear from the figure that in order to achieve an advantageous image effect it is not sufficient if the projection screens 2 viewed simultaneously from different angles of view display a mutually identical brightness, something which can be achieved by a lenticular sheet mounted additionally compared with FIG. 3 on the light output side of the projection screens 2. For static and for optical reasons, in fact, the individual projection screens 2 appear in the case of rear projection modules 1 according to the state of the art to be separated by a web 13, which imparts a chessboard-type appearance to the overall image projected.

This can be attributed firstly to the fact that the projection screens 2 have to be supported mechanically in their edge areas and the known support elements required for this do not permit the projection screens 2 to be placed directly adjacent to one another. In addition, shading effects occur with the support elements of known rear projection modules 1, which prevent the light projected from the rear side onto the projection screen 2 from being able to reach the edge on the latter's light output side, as a result of which the dark stripe formation is also produced. One aspect of the invention is therefore concerned with constructing the rear projection modules 1 in such a way that they can be strung together with and/or stacked on top of one another essentially without webs 13.

Even if the projection screens 2 are strung together essentially web-free, however, the modular layout of the large projecting screen 14 may still be visible. This can be attributed to the fact that for optical reasons projection modules 1 known to date generate a light distribution on the projection screen 2 which exhibits a higher intensity in the centre of each module than at the edge. As a result of the stringing together or matrix arrangement of the rear projection modules 1 a large image is thereby obtained which displays a periodic pattern of bright-dark fluctuations, which once again shows the modular layout. A further aspect of the invention is therefore concerned with reducing or compensating for the decrease in light from the centre to the edge of a projection screen 2.

FIG. 5 shows diagrammatically in a detail from FIG. 4 how the picture elements 16 are arranged on the projection screen 2. The projection of an image depicted by a coloured liquid crystal display unit is involved. Three sub-pixels green, red and blue lie close to one another and produce in their totality a picture element 16 of the image displayed. The picture elements 16 follow one another with a spacing A. The broken line indicates the inner area of the projection screen 2 onto which light can be projected. It becomes clear from this representation that it is not necessary to construct the rear projection modules 1 in such a way that the picture elements 16 butt directly against one another at the edges of the projection screens 2, since it is sufficient by virtue of the pixel structure of the displayed image if the realizable spacing between two adjacent picture elements projected onto adjacent projection screens corresponds roughly to the spacing A of the picture elements 16 on the projection screen 2.

FIG. 6 shows by way of example a diagrammatic section through a projection screen 2 according to the invention of a rear projection module 1, with which it is brought about that the images of projection screens 2 disposed next to one another are formed essentially web-free. The projection screen 2 has a light input side 2a and a light output side 2b. It comprises a lenticular sheet 3, a Fresnel sheet 4 and a support sheet 5. The lenticular sheet 3 has on its output face 3b a lenticular structure (not shown) with a black-matrix structure. The Fresnel structure 4d of the output face 4b of the Fresnel sheet 4 faces the input face 3a of the lenticular sheet 3. Between the output face 5b of the support sheet 5 and the input face 4a of the lenticular sheet 4 are disposed, in order to produce a gap (not shown), spacer elements (likewise not shown) ensuring the surface spacing.

In the image plane 10 of the lenticular sheet 3 are situated small diffusers 11, by means of which the light is diffused. The thickness of the support sheet 5 comes to 6 mm, the thickness of the Fresnel sheet 40.7 mm and the thickness of the lenticular sheet 35.6 mm, wherein the spacing of the image plane 10 relative to the output surface 3b comes to 1.2 mm. The surface dimension of the input face 5a of the support sheet 5 is smaller than the surface dimension of the output face 5b, which corresponds to the surface dimension of the input face 4a and output face 4b of the Fresnel sheet 4. The surface dimension of the input face 3a of the lenticular sheet 3 is smaller than the surface dimension of the output face 3b, namely by 0.6 mm. The output face 3b of the lenticular sheet 2 therefore projects beyond the input face 3a by 0.3 mm on both sides.

An area of the peripheral surface 5c of the support sheet 5, which connects the input face 5a to the output face 5b, is supported by a fixing part 8 which is the partial section of a support element 7, which partial section is situated in the propagation direction of the projected light at the end. The support element 7 holds the projection screen 2 on the side of the input face 2a. The fixing part 8 is formed as a truncated wedge, and the support sheet 5 is correpondingly profiled on its peripheral surface 5c connecting the input face 5a to the output face 5b. The fixing part 8 penetrates over a length of about a half to a third of the thickness of the support sheet 5 from the input face 5a into the support sheet 5.

The peripheral surface 5c of the support sheet 5 and the fixing part 8 are so formed that the light ray 17 of a picture element closest to the edge can reach the edge of the Fresnel structure 4d of the Fresnel sheet 4, from where it enters the rim of the input face 3a of the lenticular sheet 3. The profile of the peripheral surface 5c can in principle be given any shape. The thicker the fixing part 8 is, the greater is the mechanical strength of the support of the projection screen 2. An optimum material thickness can be achieved with a wedge-shaped construction, wherein the light ray 17 passes through the support sheet 5, at the same time grazing the profile.

The peripheral surface 5c of the support sheet 5 is connected to the fixing part 8 in an area of the space between it and the fixing part 8 by means of a suitable connection technique, for example by bonding or ultrasonic welding. The peripheral surface 5c of the support sheet 5 can also be constructed in a terraced or stepped shape or in another manner, it being necessary always to ensure that the edge ray 17 can spread unimpeded up to the rim of the lenticular sheet 4. Preferably the spacing of the light ray 17 of a picture element closest to the edge on the output face 4c of the Fresnel sheet 4 from the rim of the latter should come to not more than 1.0 mm, preferably not more than 0.5 mm.

The peripheral surface 3c of the lenticular sheet 3 is likewise of step-shaped construction. The step is not located within the area between the output face 3b and the image plane 10, so that the light diffused by the diffusers 11 can escape through the edge 18 between the output face 3b and the peripheral surface 3c. In this way the gap between two adjacent projection sheets 2 is brightened and the image is also virtually webless under large angles of view.

A 0.25 mm thick connection means 9, which is thus 0.05 mm thinner than the height of the step in the support sheet 3, connects the support sheet 5 in an area of its peripheral surface 5c to an area of the peripheral surface 3c of the lenticular sheet and thus provides a mechanical connection of the lenticular sheet 3 with the support sheet 5 supported by the support element 7. At the same time the Fresnel sheet 4 disposed between them is fixed in its position. The connection means 9 is for example an adhesive strip which rests with its adhesive surface against the peripheral surfaces 3c of the lenticular sheet 3 and 5c of the support sheet 5. The adhesive strip acts in the example shown simultaneously also as a securing means 12 between the peripheral surface 5c of the support sheet 5 and the outer surface 8c of the fixing part 8 or of the support element 7.

The arrangement essentially without webs of large projection screens 2 of, for example, 1000 mm×750 mm area is also possible with the construction according to the invention of the rear projection module 1 and of the projection screen 2. With large sheets of this kind account should naturally also be taken of the thermal expansion, by adhering to a minimum lateral spacing of the projection screens 2, since a temperature change of as little as 10° C. results in a change in the surface dimensions of about 1 mm.

FIG. 6a shows the use of spacing elements 6a between sheets 4 and 5 in the form of pins or a fabric or gauge-type structure.

FIG. 7 shows a modified version, compared with FIG. 6, of a projection screen 2 with support element 7. It differs in that the peripheral surfaces 3c of the lenticular sheet 3 and 5c of the support sheet 5 are of different construction. The peripheral surface 3c of the support sheet 3 exhibits a chamfering, which can optionally also be connected to the connection means 9 by means of suitable connection techniques. In this case also the peripheral surface 3c of the lenticular sheet 3 is so constructed that the light diffused by the diffusers 11 can escape through the edge 18 at the rim and in the corners of the output side 2b of the projection screen 2. The peripheral surface 5c of the support sheet 5 is not wedge-shaped in this example, but step-shaped. The material thickness and the carrying power of the fixing part 8 are consequently reduced, but can still be sufficient for many applications. In this case also the light propagation of the ray 17 closest to the edge is not impeded on its path from the input face Sa of the support sheet 5 to the edge of the Fresnel structure 4d.

FIG. 8 shows a view onto the output face 3b of two projection screens 2 arranged next to one another, which shows how close to the rim or the edge 18 of the lenticular sheet the picture elements 16 can be projected. The edge spacing D can be smaller than 0.75 mm and even reach values of 0.3 mm or less.

FIG. 9 shows a diagrammatic representation of a horizontal section through a rear projection module 1 according to the invention. The projection screen 2 is secured to a support frame 19 by means of the support elements 7. The projection screen 2 is disposed on the front side 41 of a module housing 40, which screens the light input face 2a of the projection screen 2 from environmental influences. The module housing 40 is likewise secured to the support frame 19. The projection unit 30 is disposed on the inside 42 of the module housing 40. It comprises a projecting lens 33 and a Fresnel lens 35. The projecting lens 33 has an intercept length of 1200 mm for a 1000 mm×750 mm projection screen 2. An image deflecting mirror 31 is also provided, with which the overall depth of the rear projection module 1 is reduced, since the optical axis 36 is angled.

The module housing 40 comprises a first side wall 48 and a second side wall 49 opposite the latter. In a cutout 44 of the wall surface 43 of the second side wall 49 the light transmissive picture generator 15 is disposed. The illumination unit 20 is disposed outside the module housing 40. It is located in a light source housing 51 and comprises a light source 21, a reflector 22, a light deflecting mirror 24, a condenser 25 constructed as a free-form condenser lens 23 with a Fresnel condenser 34.

The module housing 40 is recessed in a corresponding area 45, which is provided for the accommodation of a light source housing 51 attached to an adjacent rear projection module 1. The recess is situated on the rear side 47 of the module housing 40 at the transition point 50 to the first side wall 48. In this way the rear projection modules 1 can be arranged against one another without webs despite a smaller overall depth.

FIG. 10 shows a detail from FIG. 9 with a modified light source housing 51, said housing showing a chamfering corresponding to the positioning of the image deflecting mirror 31. The projecting lens 33 is supported on the inside 42 of the module housing 40 by the lens support 38. The light transmissive picture generator 15 is situated exactly in the plane of the second side wall 49 in a cutout 44. The light source housing 51 is accommodated on the outside of the module housing 40 so as to be detachable by means of diagrammatically shown securing elements 52. The Fresnel condenser 34 ensures that the light transmissive picture generator 15 is illuminated parallel to the optical axis 36, and the Fresnel lens 35 ensures that the light is bundled onto the projecting lens 33. On account of the light deflecting mirror 24 disposed in the light source housing 51, the light source 21 is easily accessible from the rear side of rear projection modules disposed next to one another, so that a simple lamp change can be made if necessary.

FIG. 11 shows a diagrammatic rear view of a light source housing 51 disposed at the cutout 44 of the module housing 40. It is suspendable by means of the securing element 52 on the second side wall 49, in whose wall surface 43 the light transmissive picture generator 15 is disposed.

FIG. 12 shows diagrammatically in a magnified view the securing element 52. It is constructed in the form of two intermeshing hooks, and the pattern of movement during the insertion of the light source housing 51 into the securing element 52 on the module housing 40 is indicated by the arrows.

FIG. 13 shows a perspective, diagrammatic view of a rear projection module 1 according to the invention. The rear projection module 1 is a stand-alone projector and comprises a projection screen 2 with the dimensions 1000 mm×750 mm. It is disposed on the front side 41 of a module housing 40. The module housing 40 comprises a rear wall 47 lying opposite the front side together with a first side wall 48 and a second side wall 49. The light source housing 51 is attached to the second side wall 49. The rear wall 47 comprises at the transition point 50 in a corresponding area 45, which is provided for the accommodation of a light source housing 51 of an adjacent rear projection module 1, a chamfering 46. In this way the module housings 40 of rear projection modules 1 arranged next to one another can be arranged so as to penetrate one another, even if the module housing 40 has an essentially cuboid-shaped basic shape.

In FIG. 14 it is shown how four such rear projection modules 1 according to the invention can be arranged in a matrix arrangement, wherein an essentially webless connection of the four subsidiary images is achieved.

FIG. 15 shows a diagrammatic horizontal section through the arrangement according to FIG. 14. The advantages of the construction according to the invention of the projection screens 2 and of the module housings 40 are seen clearly here. The projection screens 2 and the images projected thereon butt against one another virtually free of webs and the overall depth of the rear projection modules 1 is small, so that requisite maintenance operations on the illumination units 20 or the light transmissive picture generators 15 can easily be carried out. In addition the adjustment elements 32, with which the image deflecting mirrors 31 are secured, can easily be reached from the rear side of the rear projection modules 1 for setting operations.

FIG. 16 shows a diagrammatic top view onto rear projection modules 1 arranged in line next to one another, which display on a large projecting screen 14 for observers 6 an overall image composed of subsidiary images which is essentially web-free. FIG. 17 shows, as a modification of the latter, a polygonal arrangement.

FIG. 18 shows a diagrammatic matrix arrangement of six rear projection modules 1 with the associated electronic controller 53. The electronic controller 53 breaks down the incoming image signal into six individual image signals for the respective rear projection modules 1. With advantage the electronic controller 53 is so constructed that objects to be displayed can be represented and moved overlappingly from one projection screen 2 to the other. Because of the modular construction the large projecting screen 14 can be realised with as high a resolution as is desired.

In FIG. 19 the rear side of an image deflecting mirror 31 is shown. The latter comprises four adjustment elements 32 attached thereto and arranged in a rectangle, with which the mirror 31 can be secured to a support.

FIG. 20 shows a section along the line XX—XX in FIG. 19. The mirror support 39 is indicated by a broken line. The adjustment elements 32 are adjustable independently of one another, so that the spacing of the mirror from the mirror support 39 can be changed at the four points at which the adjustment elements 32 are located. The curvature of the surface of the mirror 31 can thereby be changed slightly.

The adjustment procedure of the adjustment elements 32 is illustrated in FIG. 21, which shows a top view of the rear side of the image deflecting mirror 31. If the adjustment elements 32 are turned in the direction of the arrow or in the direction opposite to the arrow, the distance between image diverting mirror 31 and mirror support 39 changes.

The effect thereby exerted on the image edge 26 is shown in FIG. 22, which is a top view onto the corner region of an output face 3b of the lenticular sheet 3. The image edge 26 of a projected image shows the ideal setting. On rotation of the adjustment elements 32 in the direction of the arrow a different shape 26a is obtained and on rotation in the direction opposite to the arrow the different shape 26b. In this way it is possible to adjust the mirror in such a way that a correction of distortion errors is possible and an ideal image edge 26 can be set.

In FIG. 23 it is shown how a free-form condenser lens can transform an axially symmetrical light distribution into an intensity distribution adapted to the object format 27. To this end light portions which lie outside the object format 27 are imaged onto the object format 27 in the manner indicated by the arrow. A considerable increase in the light intensity can be achieved in this way. The free-form condenser lens can either produce a uniform intensity distribution in the object format, or it can however also serve to develop the intensity distribution in the object format increasingly from the centre towards the edge, in order thereby to compensate towards the edge for the decrease in intensity occasioned by other optical components.

FIGS. 24 and 25 show a modified construction of a rear projection module 1 according to the invention, which is of advantage if the projection screen 2 is not to be placed side by side with other projection screens 2. It comprises a stand 54, in which the projection unit 30 and the illumination unit 20 are disposed. The illumination unit 20 is also here accommodated in a light source housing 51, which is removably attached to the wall surrounding the light transmissive picture generator 15.

FIG. 26 shows various equations for a free-form condenser lens which has been developed in the context of the invention for a rear projection module whose projection screen has the dimensions 1000 mm×750 mm, where use was made of a light transmissive liquid crystal display unit with 10.4 inches for the diagonal. The faces of the free-form condenser lens are so-called B-spline functions of the non-parametrized kind according to equation 1. The $w_{ij}$ are here the weighting functions tabulated in equations 4–6, which characterize the particular surface geometry of individual lenses according to the requirements of the illumination engineering specifications, and the $B_{ij}$ are the B-spline basis functions.

x, y and z are here the coordinates in a Cartesian system of coordinates. The z-axis corresponds to the optical axis. The x-axis is parallel with the long side of the light transmissive liquid crystal display unit, the y-axis is arranged perpendicular to the long side. Principles of the theory of spline functions and in particular an algorithm for calculating B-spline basis functions, which was applied in the context of the invention, are shown in the book "An introduction to splines for use in computer graphics and geometric modeling"; R. H. Bartels, J. C. Beatty, B. A. Barsky, Morgan Kaufmann Publishers Inc., Los Altos, Calif., 1987. The two-dimensional applications described specifically in this book can be generalized to three-dimensional applications. The B-spline basis functions are segments of third order polynomials, which are produced by means of a recursion procedure.

The knot vectors according to equations 2 and 3 form the basis for calculating the segmentally defined B-spline basis functions and are connected with the fixing of the definition ranges of these B-spline basis functions defined in interceptions. The number of components of the knot vectors is limited by the computing power available. In order to simplify the problem, it is advantageous if the differences of the components of the knot vectors are identical, i.e. the components are arranged equidistant. The knot vectors according to equations 2 and 3 have proved to be advantageous for a projecting lens of approx. 80 mm diameter.

The number of weighting factors $w_{ij}$ has to be limited for reasons of computing power. It is furthermore also not essential to calculate an excessively large number in view of the manufacturing accuracy achievable. It has proved to be advantageous in the context of the invention if i=j=8. Since the optical problem can be reduced to four quadrants, which lie with mirror symmetry relative to one another, it is sufficient to calculate a 4×4 sub-matrix of the 8×8 matrix. All the optical components, in particular the light source, the reflector and the projecting lens, are allowed for in the calculation and included together with their modelbased properties in the solution of the underlying illumination engineering problem. Equations 4, 5 and 6 give three different variants, which represent advantageous solutions for achieving a uniform brightness of the projected image on the projection screen.

List of reference symbols
1 rear projection module
2 projection screen
2a input face to 2
2b output face to 2
3 lenticular sheet
3a input face to 3
3b output face to 3
4 fresnel sheet
4a input face to 4
4b output face to 4
4c peripheral surface to 4
4d fresnel structure
5 support sheet
5a input face to 5
5b output face to 5
5c peripheral surface to 5
6 observer
7 support element
8 fixing part
8c outer surface to 8
9 connection means
10 image plane
11 diffuser
12 fixing means
13 web
14 large projecting screen
15 light transmissive picture generator
16 picture element
17 ray
18 edge
19 support frame
20 illumination unit
21 light source
22 reflector
23 free-form condenser lens
24 light deflecting mirror
25 condenser
26 image edge
27 object format
30 projection unit
31 image deflecting mirror
32 adjustment element
33 projecting lens
34 fresnel condenser
35 fresnel lens
36 optical axis
37 projector
38 lens support
39 mirror support
40 module housing
41 front side
42 inside
43 wall surface
44 cutout
45 corresponding area
46 chamfering
47 rear wall
48 first side wall
49 second side wall
50 transition point
51 light source housing
52 fixing element
53 electronic controller
54 stand
D edge spacing
A spacing

I claim:

1. Large-area projection screen (2) for displaying an image from a rear projection module, wherein the projection screen (2) comprises a lenticular sheet (3) and a support sheet (5), each of which has a light-input-side face (3a, 5a) facing the projection unit (30), a light-output-side face (3b, 5b) lying opposite the latter and a peripheral surface (3c, 5c) connecting the input face to the output face and a Fresnel structure (4d) disposed between its input face (2a) and its output face (2b), characterized in that the surface dimensions of the lenticular sheet (3) and of the support sheet (5) each are arranged to have a least one dimension smaller on the light-input-side face (3a,5a ) than on the light-output-side face (3b, 5b), wherein the surface dimensions of the light-input-side face (3a) of the lenticular sheet (3) and of the light-output-side face (5b) of the support sheet (5) correspond to those of the Fresnel structure (4d) disposed between them, the support sheet (5) is constructed such that it may be supported on its peripheral surface (5c) by a support element (7), wherein a partial section of the support element serves as a fixing part (8) and the partial section is situated in the propagation direction of the projected light at the end of the support element (7) and clasps the support sheet (5) at least in certain sections of its peripheral surface (5c), and an area of the peripheral surface (3c) of the lenticular sheet (3) is constructed such that it may be connected to at least one of an area of the peripheral surface (5c) of the support sheet (5) and an area of the outer surface of the fixing part (8) by means of a connection means (9) arranged peripherally distributed at least in certain sections, wherein the outer dimensions of the fixing part (8) and of the connection means (9) exceed the surface dimensions of the light-output-side face (3b) of the lenticular sheet (3) by not more than the spacing A of adjacent picture elements (16) on the projection screen (2).

2. Projection screen (2) according to claim 1, characterized in that the surface dimensions of the light-output-side face (3b) of the lenticular sheet (3) are less than 2 mm greater than those of the light-input-side surface (3a).

3. Projection screen (2) according to claim 1 or 2, characterized in that the peripheral surface (3c) of the lenticular sheet (3) is con-structed in such a way that the light of a picture element (16) closest to the edge of the image plane (10) of the projected image, which image plane (10) is situated in the lenticular sheet (3), can exit unimpeded through the edge of the light-output-side face (3b) of the lenticular sheet (3).

4. Projection screen (2) according to claim 1 or 2, characterized in that the peripheral surface (3c, 5c) of at least one of the lenticular sheet (3) and of the support sheet (5) is constructed one of step- and terrace-shaped.

5. Projection screen (2) according to claim 1 or 2, characterized in that the Fresnel structure (4d) is formed on a Fresnel sheet (4) which is disposed between the support sheet (5) and the lenticular sheet (3).

6. Projection screen (2) according to claim 5, characterized in that the Fresnel structure (4d) is formed on the light-output-side face (4b) of the Fresnel sheet (4).

7. Projection screen (2) according to claim 6, characterized in that the light-input-side face (4a) of the Fresnel sheet (4) is connected firmly to the light-output-side face (5b) of the support sheet (5).

8. Projection screen (2) according to claim 6, characterized in that the light-input-side face (4a) of the Fresnel sheet (4) rests against the light-output-side face (5b) of the support sheet (5).

9. Projection screen (2) according to claim 6, characterized in that the light-input-side face (4a) of the Fresnel sheet (4) is separated by a gap from the light-output-side face (5b) of the support sheet.

10. Projection screen (2) according to claim 9, characterized in that the width of the gap is less than 0.5 mm.

11. Projection screen (2) according to claim 6, 7, 8, 9, or 10, characterized in that at least one spacer element ensuring the maintenance of a small surface spacing is disposed between the light-output-side face (5b) of the support sheet (5) and the light-input-side face (4a) of the Fresnel sheet (4).

12. Projection screen (2) according to claims 11, characterized in that the spacer element comprises a multiplicity of pins.

13. Projection screen (2) according to claim 11, characterized in that the spacer element comprises a fabric- or gauze-type structure.

14. Projection screen (2) according to claims 5, characterized in that the Fresnel sheet (4) is a Fresnel film with a thickness of less than 1.0 mm.

15. Projection screen (2) according to claim 1, characterized in that the lenticular sheet (3) is surface laminated on the light-input- (3a) and the light-output-side (3b) face.

16. Projection screen (2) according to claim 1, characterized in that the support sheet (5) is surface laminated on the light-input- (5a) and the light-output-side (5b) face.

17. Projection screen (2) according to claim 1, wherein the outer dimensions of the fixing part (8) and of the connection means (9) are not greater than the surface dimensions of the light-output-side face (3b) of the lenticular sheet (3).

18. Projection screen (2) according to claim 17, characterized in that the fixing part (8) encloses the peripheral surface (5c) of the support sheet (5) and is constructed wedge-shaped.

19. Projection screen (2) according to claim 17, or 18, characterized in that an area of the peripheral surface (5c) of the support sheet (5) is connected to the fixing part (8) by a securing means (12) disposed peripherally at least in certain sections.

20. Projection screen (2) according to claim 19, characterized in that the connection means (9) is also the securing means (12).

21. Projection screen (2) according to claimed 19, characterized in that at least one of the connection means (9) and the securing means (12) is constructed as an adhesive strip.

22. Rear projection module for displaying an image on a large-area projection screen (2), comprising;

a light transmissive picture generator (15) for depicting an image on a reduced scale, an illumination unit (20) for the transillumination of the light transmissive picture generator (15), a projection unit (30) for the enlarged imaging onto the projection screen (2) of the image depicted by the light transmissive picture generator (15), and a projection screen comprising a lenticular sheet (3) and a support sheet (5), each of which has a light-input-side face (3a, 5a) facing the projection unit (30), a light-output-side face (3b, 5b) lying opposite the latter and a peripheral surface (3c, 5c) connecting the input face to the output face and a Fresnel structure (4d) disposed between its input face (2a) and its output face (2b), characterized in that the surface dimensions of the lenticular sheet (3) and of the support sheet (5) each are arranged to have at least one dimension smaller on the light-input-side face (3a,5a) than on the light-output-side face (3b, 5b), wherein the surface dimensions of the light-input-side face (3a) of the lenticular sheet (3) and of the light-output-side face (5b) of the support sheet (5) correspond to those of the Fresnel structure (4d) disposed between them, the support sheet (5) is constructed such that it may be supported on its peripheral surface (5c) by a support element (7), wherein a partial section of the support element serves as a fixing part (8) and the partial section is situated in the propagation direction of the projected light at the end of the support element (7) and clasps the support sheet (5) at least in certain sections of its peripheral surface (5c), and an area of the peripheral surface (3c) of the lenticular sheet (3) is constructed such that it may be connected to at least one of an area of the peripheral surface (5c) of the support sheet (5) and an area of the outer surface of the fixing part (8) by means of a connection means (9) arranged peripherally distributed at least in certain sections, wherein the outer dimensions of the fixing part (8) and of the connection means (9) exceed the surface dimensions of the light-output-side face (3b) of the lenticular sheet (3) by not more than the spacing A of adjacent picture elements (16) on the projection screen (2).

23. Rear projection module for displaying an image on a large-area projection screen (2), comprising
a light transmissive picture generator (15) for depicting the image on a reduced scale,
an illumination unit (20) for the transillumination of the light transmissive picture generator (15) and
a projection unit (30) for the enlarged imaging onto the projection screen (2) of the image depicted by the light transmissive picture generator (15),
with a module housing (40) screening a light input face (2a) of the projection screen (2) from ambient light, on the front side (41) of which module housing (40) the projection screen (2) is disposed,
characterized in that
the projection unit (30) is disposed on the inside (42) of the module housing (40),
the light transmissive picture generator (15) is disposed in a cutout (44) in a wall area (43) of the module housing (40),
the illumination unit (20) is disposed outside the module housing (40) in a light source housing (51) which is removable at the cutout (44) of the module housing (40) and can be attached to the module housing (40) in such a way that it projects out of the wall area (43) of the module housing (40).

24. Rear projection module according to claim 23, characterized in that the module housing (40) comprises in a corresponding area (45), which is provided for a light source housing (51) secured to an adjacent rear projection module (1), a chamfering (46), opening or cutout accessible from its outside, said chamfering (46), opening or cutout being so constructed that the light source housing (51) of the adjacent rear projection module (1) can be disposed in the corresponding area (45).

25. Rear projection module according to claim 24, characterized in that the module housing (40) comprises a rear wall (47) which is arranged opposite a front side (41), and at least two oppositely disposed side walls (48, 49) connecting the front side (41) to the rear wall (47), wherein the rear wall (47) comprises at the transition point (50) to the first side wall (48) the chamfering (46), opening or cutout, and in the second side wall (49) the cutout (44) for the light transmissive picture generator (15) is disposed.

26. Rear projection module according to claim 25, characterized in that the chamfering (46), opening or cutout extends in a vertical direction through the rear wall (47) and the first side wall (48).

27. Rear projection module according to claim 23, 24, 25 or 26, characterized in that there is disposed in the light source housing (51) a light deflecting mirror (24) and the light source (21) of the illumination unit (20) is accessible from the rear side of the rear projection module (1).

* * * * *

UNITED STATES PATENT AND TRADEMARK OFFICE
CERTIFICATE OF CORRECTION

PATENT NO. : 5,897,192
DATED : April 27, 1999
INVENTOR(S) : Heinz Seufert

It is certified that error appears in the above-identified patent and that said Letters Patent is hereby corrected as shown below:

Title Page [76]          Delete "Vogelsang 31, D-76229" and substitute
-- Geigerbergstrasse 42, D-76227 --

Signed and Sealed this
First Day of February, 2000

Attest:

Q. TODD DICKINSON

*Attesting Officer*      *Acting Commissioner of Patents and Trademarks*